(12) United States Patent
Signanini

(10) Patent No.: US 10,730,797 B2
(45) Date of Patent: Aug. 4, 2020

(54) MATERIAL, USE THEREOF AND METHOD TO MANUFACTURE SAID MATERIAL

(71) Applicant: SIGNA LABS S.R.L., Milan (IT)

(72) Inventor: Patrizio Signanini, Lecce (IT)

(73) Assignee: SIGNA LABS S.R.L. (IT)

( * ) Notice: Subject to any disclaimer, the term of this patent is extended or adjusted under 35 U.S.C. 154(b) by 0 days.

(21) Appl. No.: 15/758,886

(22) PCT Filed: Sep. 9, 2016

(86) PCT No.: PCT/IB2016/055382
§ 371 (c)(1),
(2) Date: Mar. 9, 2018

(87) PCT Pub. No.: WO2017/042727
PCT Pub. Date: Mar. 16, 2017

(65) Prior Publication Data
US 2018/0282220 A1  Oct. 4, 2018

(30) Foreign Application Priority Data

Sep. 11, 2015  (IT) .................. 102015000050831

(51) Int. Cl.
*C04B 33/04* (2006.01)
*C04B 33/30* (2006.01)
(Continued)

(52) U.S. Cl.
CPC .............. *C04B 33/04* (2013.01); *C04B 33/00* (2013.01); *C04B 33/13* (2013.01); *C04B 33/30* (2013.01);
(Continued)

(58) Field of Classification Search
CPC ......... C04B 33/04; C04B 33/00; C04B 33/13; C04B 38/06; C04B 35/64;
(Continued)

(56) References Cited

U.S. PATENT DOCUMENTS

| 4,888,309 | A | 12/1989 | Araya | |
|---|---|---|---|---|
| 2013/0330530 | A1* | 12/2013 | Okuya | .................... C04B 33/04 428/218 |

FOREIGN PATENT DOCUMENTS

| DE | 4411644 | 5/1995 |
|---|---|---|
| EP | 0264268 | 4/1988 |
| EP | 2617696 | 7/2013 |

OTHER PUBLICATIONS

Corresponding International Search Report and Written Opinion for PCT/IB2016/055382 dated Nov. 21, 2016.

* cited by examiner

*Primary Examiner* — Noah S Wiese
(74) *Attorney, Agent, or Firm* — The Belles Group, P.C.

(57) ABSTRACT

Material, use thereof and method to manufacture said material; wherein the material is porous and has: a total porosity ranging from 50% to 80%, in particular from 60% to 70%; interconnected pores; at least a part made of a hydrophilic material, in particular at least a part of the inner surfaces of the pores is made of a hydrophilic material; a permeability coefficient greater than $10^{-6}$ m/sec; and wherein, in a given volume of the material, the total volume of pores with a diameter ranging from 0.1 μm to approximately 0.3 nm is at least greater than 15% of the total volume of the pores, preferably it ranges from 15 to 36%.

37 Claims, 16 Drawing Sheets

(51) Int. Cl.
| | |
|---|---|
| *C04B 35/626* | (2006.01) |
| *C04B 38/06* | (2006.01) |
| *C04B 33/00* | (2006.01) |
| *F28F 13/00* | (2006.01) |
| *C04B 35/64* | (2006.01) |
| *C04B 33/13* | (2006.01) |
| *F28D 5/02* | (2006.01) |
| *F28D 5/00* | (2006.01) |

(52) U.S. Cl.
CPC .... *C04B 35/6263* (2013.01); *C04B 35/62655* (2013.01); *C04B 35/62695* (2013.01); *C04B 35/64* (2013.01); *C04B 38/06* (2013.01); *F28D 5/00* (2013.01); *F28D 5/02* (2013.01); *F28F 13/003* (2013.01); *C04B 2235/3201* (2013.01); *C04B 2235/3208* (2013.01); *C04B 2235/3409* (2013.01); *C04B 2235/349* (2013.01); *C04B 2235/3418* (2013.01); *C04B 2235/44* (2013.01); *C04B 2235/442* (2013.01); *C04B 2235/5427* (2013.01); *C04B 2235/5472* (2013.01); *C04B 2235/608* (2013.01); *C04B 2235/6026* (2013.01); *C04B 2235/783* (2013.01); *C04B 2235/786* (2013.01); *C04B 2235/96* (2013.01)

(58) Field of Classification Search
CPC .......... C04B 35/62695; C04B 35/6263; C04B 2235/786; C04B 2235/783; C04B 2235/608; C04B 2235/6026; C04B 2235/5472; C04B 2235/44; C04B 2235/349; C04B 2235/3418; F28D 5/02; F28D 5/00; F28F 13/003

See application file for complete search history.

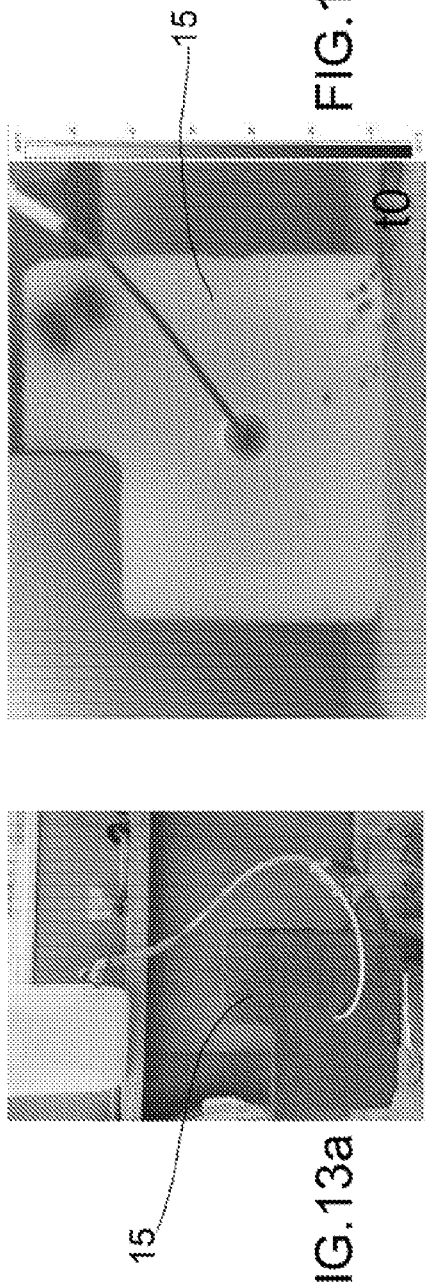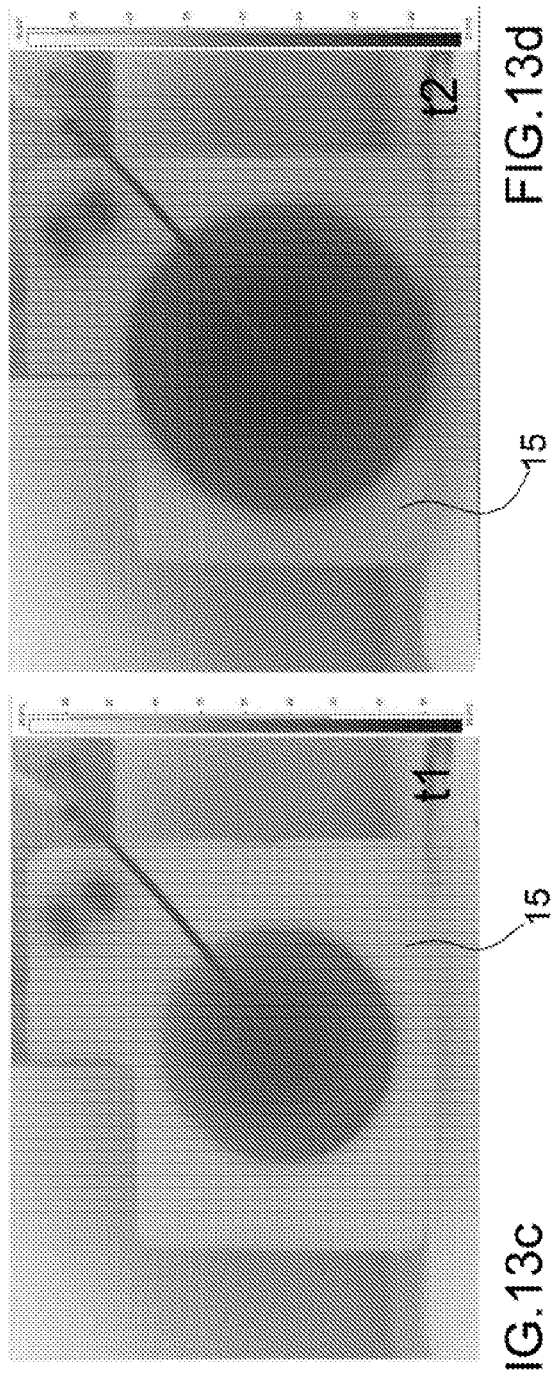
FIG.13a  FIG.13b  FIG.13c  FIG.13d

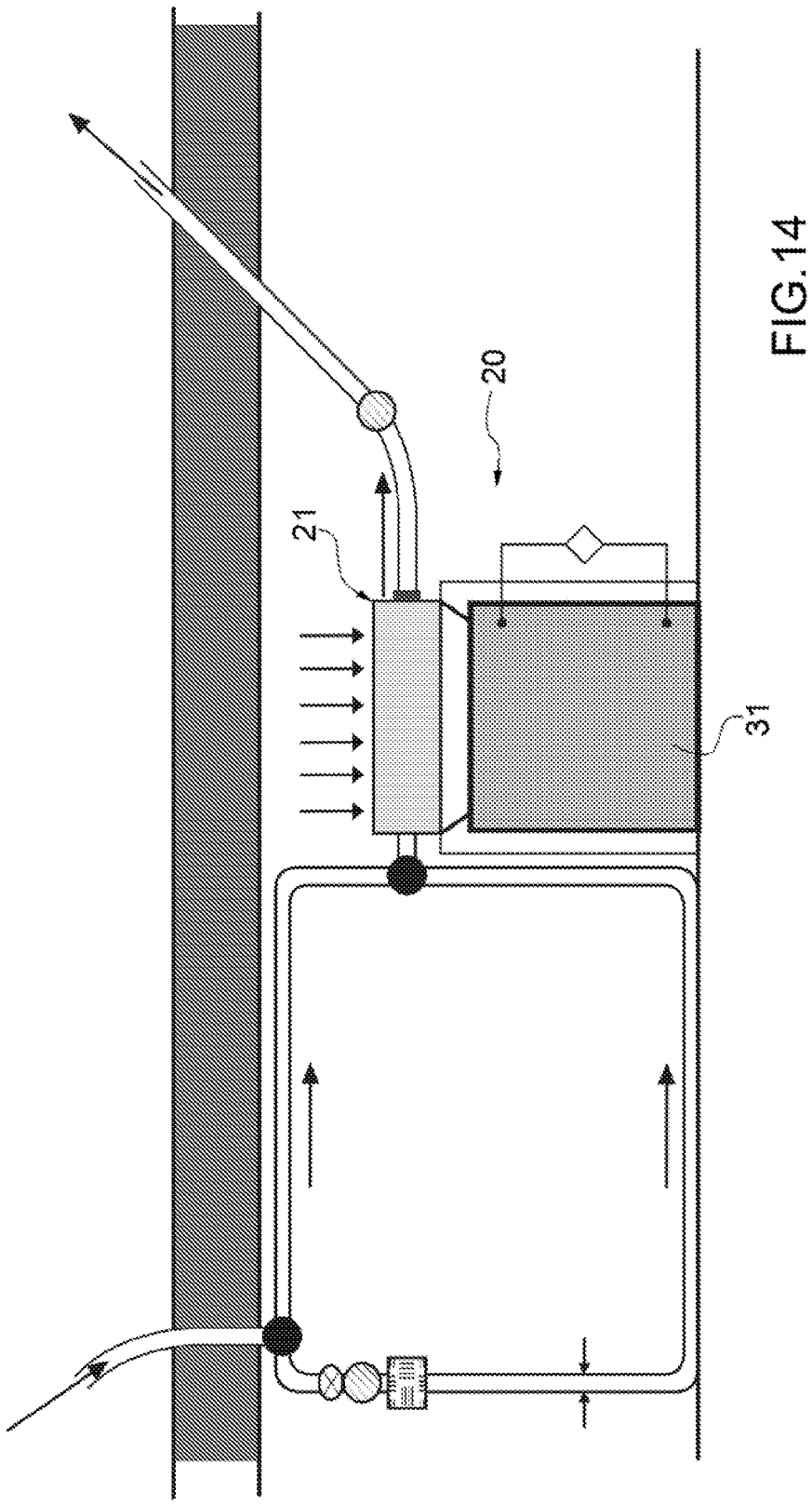

MATERIAL, USE THEREOF AND METHOD TO MANUFACTURE SAID MATERIAL

CROSS-REFERENCE TO RELATED PATENT APPLICATIONS

The present application is a U.S. national stage application under 35 U.S.C. § 371 of PCT Application No. PCT/IB2016/055382, filed Sep. 9, 2016, which claims priority to Italian Patent Application No. 102015000050831, filed Sep. 11, 2015, the entireties of which are incorporated herein by reference.

TECHNICAL FIELD

The present patent application concerns a material, the possible uses thereof and a method to manufacture said material.

In particular, the present invention concerns a material which can be advantageously used for one or more of the following purposes: to maximize the evaporation of liquids; maximize the dissociation of water; cool; absorb liquids; filter liquids; promote capillary ascension of liquids; produce hydrogen from water.

BACKGROUND ART

For example, said material can be used inside a cooling system. It should be remembered that different cooling systems are known which promote evaporation of the water for the purposes, for example, of cooling air to the wet-bulb temperature of the air. Said cooling systems can be classified into direct and indirect systems. In the former, the flow of air in which water is evaporated in order to cool it is introduced directly into the environment to be cooled; in this case, however, the water vapour content of the environment to be cooled is increased. To remedy this drawback indirect systems are used where a second internal air circuit is cooled by a first external air circuit in which water is evaporated. However, the exchange of heat between the two air flows requires bulky and costly air-air or water-air-water exchangers.

To maximize evaporation of the water in direct and indirect cooling systems, the use of "water curtains" is known, or nebulizers (which nevertheless require an energy supply) or the water is contained in absorbing materials, like natural or synthetic sponges, through which an air flow is passed.

However, the sponges of known type have numerous drawbacks including that of causing a large part of the liquid contained inside to drip out by gravity (gravity water). In other words, once wetted, the absorbing material (i.e. the sponges) of known type is not able to retain the liquid inside it, avoiding percolation of the water to the outside, by gravity. Therefore, the absorbing material of known type cannot be used in environments in which it is necessary to avoid or prevent the presence of free liquids, for example environments in which electrical material is present.

The overall dimensions and cost of the heat exchangers in indirect cooling systems also makes it uneconomical to use systems like the cascade systems cited above via which, otherwise, it could also be possible to reach a final temperature lower than the wet-bulb temperature of the ambient air obtained with the direct cooling systems.

An example of a direct cooling system is provided in the document US 2010/0281896 A1 where an air flow to be cooled is sucked through wet cellulose honeycomb cell elements.

An example of an indirect cooling system is described in WO2013/021147 A1. Another example of an indirect cooling system is known, for example, from the document WO 2012/168929 A2. However, the material described in WO 2012/168929 A2 and the relative cooling system have the drawback of providing limited energy efficiency since the element of material described has a limited capacity to induce the evaporation/dissociation of the water and, therefore, is not able to generate sufficient frigories, resulting in limited energy efficiency.

Furthermore, the material described in WO 2012/168929 A2 in order to function must be heated at least on one side and/or exposed to the sun.

In the state of the art there are no materials that enable, among other things, the creation of particularly efficient cooling systems and/or also useful for the evaporation of water and/or the dissociation of water and/or production of hydrogen and/or absorption of water and/or ascension of water and/or filtering of water.

DISCLOSURE OF INVENTION

The object of the present invention is to provide a material that can be used in a cooling unit to exchange frigories with a second air flow, without increasing the water vapour content thereof and having a high energy efficiency.

The object of the present invention is to provide a material that can be used to promote the evaporation of the water.

In addition, said material can be used to separate the water into ions. In this regard it is observed that systems are known for separating the water into ions, for example as a preparatory step to the production of hydrogen, but these systems, for example electrolysis, require a considerable supply of electrical energy.

The object of the present invention is to provide a material which enables dissociation of the water into ions in a simple inexpensive manner.

In addition said material can be used to promote the absorption of liquids. It is observed that systems are known for absorbing water from the ground, but these systems of known type require energy to evaporate the water in the ground and/or to centrifuge the ground.

The object of the present invention is to provide a material which is able to create appropriate conditions inside it to enable capillary ascension of water (suction of liquids) and, consequently, the possibility of expelling said water.

The object of the present invention is to provide a material which is at least partly hydrophilic, which in particular has a porosity capable of:
  speeding up the capillary ascension of a liquid, for example water, inside it;
  maximizing the capillary ascension of liquid;
  preventing the percolation of liquid due to the force of gravity (gravity water);
  providing a substantially fractal inner structure with an extensive hydrophilic surface exposed to the liquid;
  promoting the creation of a depression by capillarity inside it.

The object of the present invention is to provide, at limited cost, a material which drops in temperature when brought into contact with water.

The object of the present invention is to provide a material which is easy and inexpensive to produce and to use.

The object of the present invention is to provide a material as claimed in the attached claims.

The object of the present invention is to provide possible uses of a material as cited in the attached claims.

The object of the present invention is to provide a method for the production of a material as cited in the attached claims.

The object of the present invention is to provide a cooling unit as cited in the attached claims.

BRIEF DESCRIPTION OF THE DRAWINGS

The invention will now be described with reference to the attached drawings, which illustrate non-limiting implementation examples thereof, wherein:

FIGS. 13a to 13d are images obtained by thermocamera, at different moments, of a sample of the material according to the present invention during an experimental test;

FIG. 14 is a schematic view and with parts removed for the sake of clarity of a cooling system in which the material according to the present invention is used;

BEST MODE FOR CARRYING OUT THE INVENTION

Figure 1:
FIGS. 1 to 3 are microscope images with an enlargement visible on a graphic scale.
Figure 2:
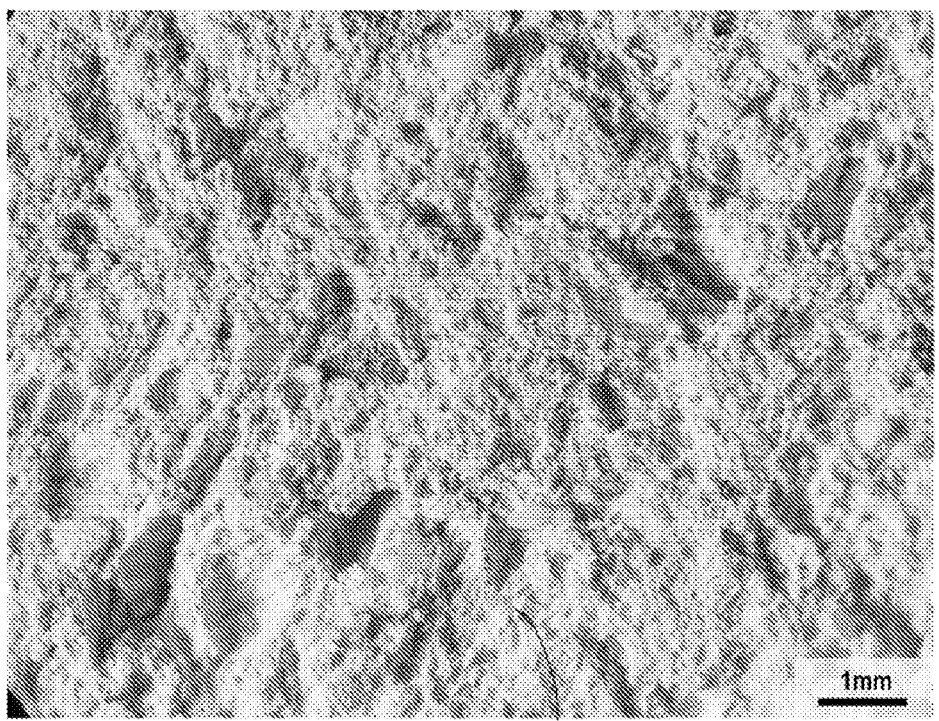
Figure 3:
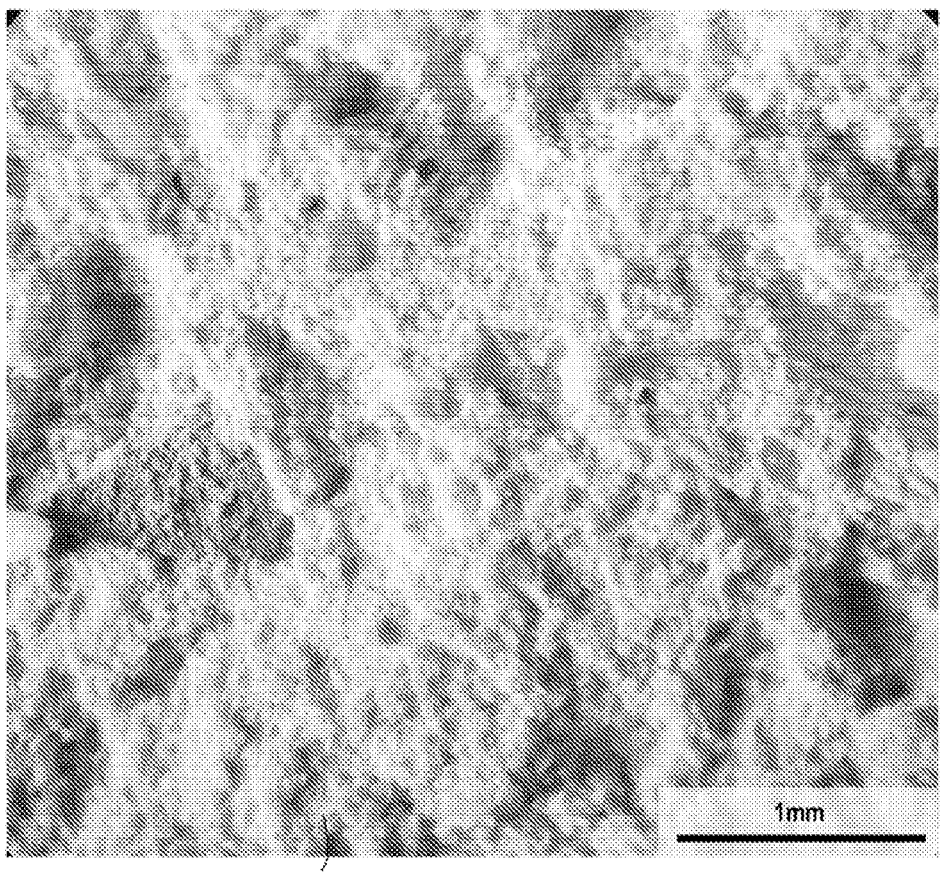

In FIGS. 1 to 3 the number 1 indicates overall a sample of the material according to the present invention. Advantageously, the material 1 is a porous material. The material 1 has an overall porosity ranging from 50% to 80%. Advantageously, the material 1 has a porosity ranging from 60 to 70%. By porosity we mean the ratio between the percentage of volume occupied by the pores and the total volume. The material 1 has a percentage of interconnected pores greater than 80%. Advantageously the material 1 has a percentage of interconnected pores greater than 90%, and preferably greater than 95%.

It is observed that the term "pores" indicates hollow structures of various dimensions which can include structures commonly known also as "capillaries".

The material 1 comprises at least a part made of hydrophilic material. At least a part of the inner surfaces of the pores is made of hydrophilic material. Advantageously, the material 1 is hydrophilic. Alternatively, the material 1 is made of non-hydrophilic material but the surfaces of the inner walls of the pores are coated, at least partially, with hydrophilic material. Preferably, the inner walls of the pores are made of hydrophilic material.

In the classic definition, the term hydrophilic indicates a substance that absorbs or adsorbs water. Generally, the characteristic of hydrophilicity of a material can refer to hygroscopy, solubility or wettability. Below by hydrophilicity we mean wettability which is determined as a function of a contact angle $\Theta$.

Figure 4:
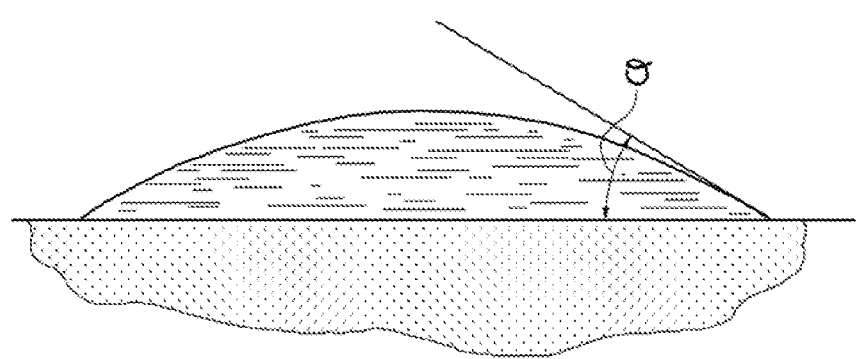
FIG. 4 illustrates schematically a drop in contact with a surface during a wettability test.

According to FIG. 4, the contact angle $\Theta$ is the angle formed by the tangent to the liquid-fluid interface, and by the tangent to the solid surface, at the contact line between the solid, liquid and gaseous phases. Different methods are known for identification of the contact angle $\Theta$, for example the Drop Shape Analysis (DSA) method, Wilhelmy plate method, Powder contact angle measurement using the Washburn method and Top-view distance method. A material is hydrophilic if the contact angle $\Theta$ is smaller than 90°.

Advantageously the material 1 has a contact angle $\Theta$ smaller than 10°. Preferably, the material 1 has a contact angle $\Theta$ smaller than 5°. Advantageously, the contact angle $\Theta$ of the partially wet material 1 is substantially equal to the contact angle $\Theta$ of the dry material 1.

Numerous hydrophilic materials are known both in nature and artificially produced. The clays extracted in nature are hydrophilic materials. Examples of artificial hydrophilic materials comprise: Nafion®; Biogel® by Polymeric Sciences, used in contact lenses; HydroThame® and HydroMed® by AdvanSource biomaterials, which can be extruded or injection moulded; and also some metal-organic materials, for example those known as HMOFs.

Many of the hydrophilic materials cited above maintain their characteristic of hydrophilicity both when dry and when wet. Some hydrophilic materials, like clays, are by nature plastically deformable but can be solidified, for example by baking.

Advantageously the material 1 has a permeability coefficient k greater than $10^{-6}$ m/sec. The permeability coefficient k is calculated by a standard test by means of constant head permeameter. In particular the permeability coefficient k is calculated according to the reference standard UNI CEN ISO/TS 17892-11. Preferably, the permeability of the material 1 is greater than $10^{-6}$ m/sec and smaller than $10^{-4}$ m/sec. Advantageously, the permeability of the material 1 is approximately $10^{-5}$ m/sec.

Advantageously, the ratio between the weight of a sample of the material 1 saturated by immersion in a liquid and the weight of the same sample saturated by capillary ascension of said liquid is at least 90%, in particular 93%.

Advantageously, in a given volume of the material 1, the overall volume of pores with diameter ranging from 0.3 nm to approximately 0.1 μm is at least 15%. Advantageously, in a given volume of the material 1, the overall volume of pores with diameter ranging from approximately 0.1 μm to approximately 0.3 nm is between 15% and 40% of the total volume of the pores.

Optionally, in a given volume of the material 1 the overall volume of pores with diameter ranging from 0.3 nm to 140 μm is greater than 5% of the total volume of the pores.

Advantageously the material 1 is solid. In other words, the dimensions and the relative distribution of the pores with the material 1 wetted (with demineralized water) are equal to the dimensions and the relative distribution of the pores with the material dry.

Advantageously, the material 1 is rigid and can be used to produce solid bodies that can be stacked on one another.

Further characteristics of the present invention will become clear from the following non-limiting examples.

Example 1

Method for Producing Material 1

The material 1 can be produced by means of "additive" process, depositing the hydrophilic material layer by layer so as to form the pores and the desired interconnections using for example a 3D printer.

Another possibility could be to produce a material having the required structure starting from a compound which is not necessarily hydrophilic, using any process including, for example, the additive or subtractive process, and then coat the inner walls of the pores and of the cavities with hydrophilic material. For example, the non-hydrophilic material could be immersed in a bath of hydrophilic material in the liquid state to cause the hydrophilic material to deposit and solidify at least on the inner walls of the pores.

Procedures are also known to make surfaces of various materials (including silicon and glass) extremely hydrophilic by exposing them to laser impulses with high power and very short duration (in the order of femtoseconds). Therefore, on the basis of this technology it is possible to perform an additive procedure starting from non-hydrophilic compounds, for example silicon or glass and, at each layer depositing step, treat the material with the techniques described above to make at least part of the inner surface of the cavities produced highly hydrophilic.

The techniques described above have the drawback of being particularly costly and are complicated and lengthy to apply.

A cheaper technique is the technique "by subtraction" which consists in starting from hydrophilic materials and producing the porous inner structure with the desired characteristics by the "subtractive" method, for example by introducing materials that create the desired cavities by combustion or dissolving, and other materials/gases which, by increasing in volume when heated, guarantee interconnection of the pores.

A method, which is particularly inexpensive and easy to perform, to produce a finished product made with the material 1 will now be described in further detail. In particular, a subtractive method is described below starting from a starting material which already exists in nature and is hydrophilic.

Advantageously the starting material derives from materials with an argillaceous nature, in other words the material 1 is a quarried argillaceous material normally used for the production of bricks. Generally, in the natural state, the starting material provides, after baking, very compact bodies with porosity around 25% and specific weight approximately 2.4 g/cm³.

Advantageously, the starting material is hydrophilic and solidifies when heated in an oven.

Advantageously the starting material comprises elements known in nature such as:

clays, which in turn include granules with a size smaller than $1/256$ mm and which have pores with a diameter of a few nm (for example phyllosilicates);

loams which have particles with a diameter ranging from approximately $1/16$ mm to approximately $1/256$ mm; and sands which have particles with diameter ranging from approximately 2 mm to approximately $1/16$ mm.

Advantageously, the starting material comprises by weight:

approximately 30% to 50% of clays;

up to approximately 35% of sands;

up to approximately 35% of loams.

Advantageously, the loams and the sands of the starting material are capable of creating partly the porous structure of the material 1, since they remain unchanged during baking.

Advantageously the starting material is mainly a silicate material in which the percentage by weight of calcium carbonate is below 15%.

The production method of the material 1 comprises the following steps:

providing the starting material;

pulverizing the starting material so as to obtain a starting powder;

forming a mixture of raw material by mixing the starting powder with a liquid, granules, in particular granules capable of burning and/or shifting to the gaseous phase, oxidising elements and, optionally, clays;

drying the mixture of raw material; and baking the raw material so as to enable combustion and/or passage of the granules to the gaseous phase and, optionally, obtaining a finished product made of the material 1.

Optionally, the method comprises a step of shaping the mixture of raw material to obtain a raw product with a given shape. If present, the shaping step is subsequent to the step of forming a mixture of raw material and prior to the drying step.

Optionally, the method comprises a step of cooling the material 1 subsequent to the step of baking the raw material.

During the step of providing the starting material, the latter is analysed and, in particular, the percentage by weight of clays is identified.

During the pulverization step, the starting material is crushed by means of techniques known in the production of bricks, for example by the use of grinding wheels, so as to obtain a starting powder with granules having diameter smaller than one millimetre. The dimension of the granules of the starting powder is measured with sieves having holes with successive dimensions.

Advantageously, the step of forming a mixture comprises the sub-steps of:

forming a granular preparation by mixing the starting powder with granules, in particular granules capable of burning and/or shifting to the gaseous phase, oxidising elements and, optionally, clays; and mixing the granular preparation with liquid so as to obtain the mixture of raw material.

It is observed that the granular preparation constitutes the solid fraction of the mixture of raw material and below, the expression "solid fraction" of the mixture refers to the sum of the weights of said starting powder and of said granules and any oxidising elements in the solid state. It is observed that the mixture of material can be formed also by mixing immediately one or more elements of the solid fraction with the liquid and adding in succession the other elements of the solid fraction until the completion of the mixture itself.

During the sub-step of forming the granular preparation, the percentage by weight of the starting powder is between approximately 40% and approximately 80% of the total weight of the granular preparation. Advantageously, the percentage by weight of the starting powder is between 60% and 70% of the total weight of the solid fraction, i.e. of the granular preparation.

During the sub-step of forming a granular preparation, granules capable of creating by subtraction and inside the material 1 additional pores with the desired dimensions are added to the starting powder. The type, dimension and quantity of the granules are selected as a function of the dimension and quantity of the additional pores to be produced and the interstices desired.

Advantageously, the granules are capable of creating additional pores inside the material 1 which cover the spectral band ranging from the millimetre to the micron. The additional pores are created during the baking step, when combustion of the sawdust granules occurs.

The granules can be sawdust particles or particles of wood flour or other known combustible material. It is observed that sawdust or wood flour are readily available in the market and generally have grain sizes ranging from the mm to the µm and, on request, can be found with even smaller dimensions.

Alternatively, the granules can be made of material which at a certain temperature shifts to the gaseous phase, for example ammonium chloride or nitrate, so as to obtain the desired additional pores.

Unless specified explicitly to the contrary, in this text, the mean diameter of the nanoparticles of the granules is measured by TEM microscopy. More precisely, the mean diameter is calculated by measuring the largest dimension of one hundred particles (taken at random) and obtaining the mean. In particular, a JEOL 3010-UHR instrument is used (acceleration potential: 300 kV; filament $LaB_6$).

Advantageously, during the sub-step of forming the granular preparation, a part of granules with grain size ranging from 0.1 mm to 0.1 µm is added to the starting powder, in a percentage ranging from approximately 10% to approximately 40% of the total weight of the solid fraction or of the granular preparation. In particular, a part of granules with grain size ranging from 0.1 mm to 0.1 µm is added to the starting powder during the sub-step of forming the granular preparation, in a percentage ranging from 20% to 25% of the total weight of the solid fraction or of the granular preparation.

Advantageously, a part of granules with grain size ranging from 0.1 µm to 1 nm is added to the starting powder during the sub-step of forming the granular preparation, in a percentage by weight ranging from 5% to 20% of the total weight of the solid fraction or of the granular preparation. In particular, a part of granules with grain size ranging from 0.1 µm to 1 nm is added to the starting powder during the sub-step of forming the granular preparation in a percentage by weight ranging from 8% to 15% of the total weight of the solid fraction or of the granular preparation.

During the sub-step of forming a granular preparation mixture, oxidising elements are added to the starting powder, capable of increasing the volume of the mixture of the raw material and/or to enable combustion and production of oxygen once a predefined temperature has been reached.

Advantageously, the oxidising elements during combustion produce oxygen capable of maintaining the additional pores open, despite the tendency of the material, before and during the baking step, to shrink, potentially clogging the additional pores. In particular, the oxidising elements are capable of expelling gas from the inside of the raw material to keep the interstices and the additional pores open during the successive steps of shaping, drying and baking so as to ensure interconnection between the pores and the interstices. The oxidising elements also enable the pores of the material 1 to be interconnected. For example, the hydrogen peroxide and the sodium perborate are oxidising elements.

Advantageously, during the step of forming a granular preparation, sodium perborate is added to the starting powder in a percentage by weight ranging from 0.1% to 1% of the total weight of the solid fraction or of the granular preparation. The sodium perborate enables the mixture to swell during the mixing sub-step. The sodium perborate emits oxygen during the baking, keeping the pores open.

During the sub-step of forming the granular preparation, the percentage by weight of clays can optionally be modified, according to the type of use of the material 1.

The percentage by weight of the clays of the material 1 can be increased with respect to the percentage of clays of the starting material during the sub-step of forming the granular preparation by adding clay granules to the starting powder, for example powdered kaolin (kaolinite) and/or powdered bentonite. A greater percentage of clay increases the solidity of the material 1 making it more rigid so that it can be used, for example, to manufacture stackable products.

For example, if a brick is produced with the material 1, it is preferable to add clay granules to the starting powder during the sub-step of forming the granular preparation, for example powdered kaolin (kaolinite) and/or powdered bentonite, in a percentage ranging from approximately 2% to approximately 10% of the total weight of the granular preparation. In this way, the material 1 can have a percentage by weight of clays up to approximately 50%.

In this regard it is observed that if clay granules are not added during the sub-step of forming the starting granular preparation, the material 1 generally has, starting from the quarried argillaceous materials on the market, a percentage by weight of clay of approximately 28%.

During the mixing sub-step, liquid is added to the granular preparation so as to obtain the mixture of raw material. Advantageously, the liquid is a mixture comprising by weight approximately 50% water and approximately 50% hydrogen peroxide at 120 volumes. Preferably the liquid is added until the mixture of raw material has a consistency of 0.1 $kg/cm^2$ measured using the Pocket Penetrometer Test.

If you wish to obtain a finished product with a given shape, the step of forming a mixture can be followed by a step of shaping, during which the mixture is modelled by means of techniques of known type so as to obtain a raw product having the desired shape. For example, to manufacture a brick, the mixture of raw material is inserted and pressed inside a mould with a cavity having a rectangular parallelepiped shape. During the shaping step, the mixture of raw material generally undergoes pressures ranging from 2 to 5 $kg/cm^2$.

During the drying step, the raw material is dried at ambient temperature to avoid problems of differential shrinkage in the mass and, consequently, problems of fracturing. The raw material is dried as far as possible and as slowly as possible before baking (drying causes a non-uniform contraction which could fracture it), since if, a non-residual quantity of water remains inside, baking of the raw material would lead to a "violent" evaporation of the liquids inside it and therefore to the formation of cracks inside it. Rapid drying of the surface part with respect to the inner part can also produce fractures. Drying can therefore be performed substantially at ambient temperature. To shorten the times, it may be expedient to make holes inside the raw material, which would be useful also in some practical applications of a finished product, for example a finished product to be applied in cooling systems.

Advantageously, during the drying step the raw material is exposed, in a known manner, inside an environment with progressively decreasing humidity and progressively increasing temperature. The drying step can last typically from one month to two months and ends when the raw material is hard and is not subject to tactile deformations. Advantageously, at the end of the drying step, the raw material has a consistency in the order of 5 kg/cm² measured using the Pocket Penetrometer Test.

During the baking step the raw material is solidified so that it can maintain the desired dimensions of the pores and their interconnections.

During the baking step, the raw material undergoes a baking cycle in the order of 16 hours.

The baking step comprises the sub-steps of baking the raw material for:

A) 4 hours with a temperature ranging from ambient temperature to 200° C. so as to eliminate the liquid still present in the dried raw material; in particular, the temperature being increased, even in a non-linear manner, from ambient temperature to 200° C.;

B) 4 hours with a temperature ranging from 200° C. to 500° C. so as to enable combustion and/or passage to the gaseous phase of the granules added to the mixture of the raw material; in particular, the temperature being increased, even in a non-linear manner, from 200° C. to 500° C.;

C) 4 hours with a temperature ranging from 500° C. to 800° C. so as to induce the change of mineralogical composition of the clays present in the mixture of raw material causing hardening and/or cementation; in particular, the temperature being increased, even in a non-linear manner, from 500° C. to 800° C.;

D) 4 hours with a temperature ranging from 800° C. to 1000° C. so as to complete hardening and/or cementation of the material (1); in particular, the temperature being increased, even in a non-linear manner, from 800° C. to 1000° C.

All the baking sub-steps listed above do not reduce or reduce only slightly or increase the hydrophilicity of the starting material, thus obtaining the material 1 with the desired structure and hydrophilicity of the inner walls of the pores.

The release of oxygen occurs during the sub-steps A and B when the sodium perborate reduction process takes place.

During the sub-step A the raw material is subjected to a temperature such as to dry the liquid still present but avoid cementation of the raw material.

The subsequent sub-steps subject the raw material to higher successive temperatures for enabling combustion of the various compounds added to create by subtraction at least a part of the desired pores, but still not at such a high temperature to solidify the raw material. In each of these sub-steps, the various liquids still contained in the raw material enable combustion and at the same time release gas so as to keep the pores open and create interconnection channels between them.

It is then possible to shift to higher temperatures where, in addition to the possible continuation of the effects cited above, the change in mineralogical composition of the clays present is induced, causing hardening and solidification.

Lastly, a temperature is reached such as to complete the solidification and, therefore, complete the material 1.

When the higher temperatures are reached, the clays of the raw material change their mineralogical composition. In the last baking sub-step with the temperatures between 800 and 10000, any calcium carbonate present is converted into calcium oxide. The selection of a starting material with percentage by weight of calcium carbonate lower than 15% reduces the formation of calcium oxide (in jargon lime lump) which tends to break or create craters inside the material 1.

At the end of the baking the material 1 is cooled, optionally obtaining a finished product with the desired characteristics.

A series of diffractometric tests were performed both relative to the starting material and the material 1 according to the method described above, in order to evaluate the mineralogical difference between the starting material and the material 1.

Said tests were performed using a diffractometer by Siemens-Bruker D5005, Geometry Bragg-Brentano Θ-2Θ.

The results obtained showed that the starting material comprised mainly the following minerals: quartz, calcite, dolomite, albite and clays such as montmorillonite, kaolinite and illite.

In the material 1 produced according to the preceding method, quartz and albite persist and/or are increased while the calcite, dolomite and illite decay. Furthermore, in the material 1 kaolinite and montmorillonite are absent, whereas some small peaks are recorded which are difficult to attribute but are probably linked to feldspar and/or amphibolite minerals.

Example 2

Measurement of Porosity of Material 1 Obtained According to Example 1

Advantageously the material 1 has a particularly wide porosity spectrum, which oscillates from $1/10$ millimetre to $1/100$ micron. In particular, the material 1 has pores also with nanometric dimensions.

Figure 5:
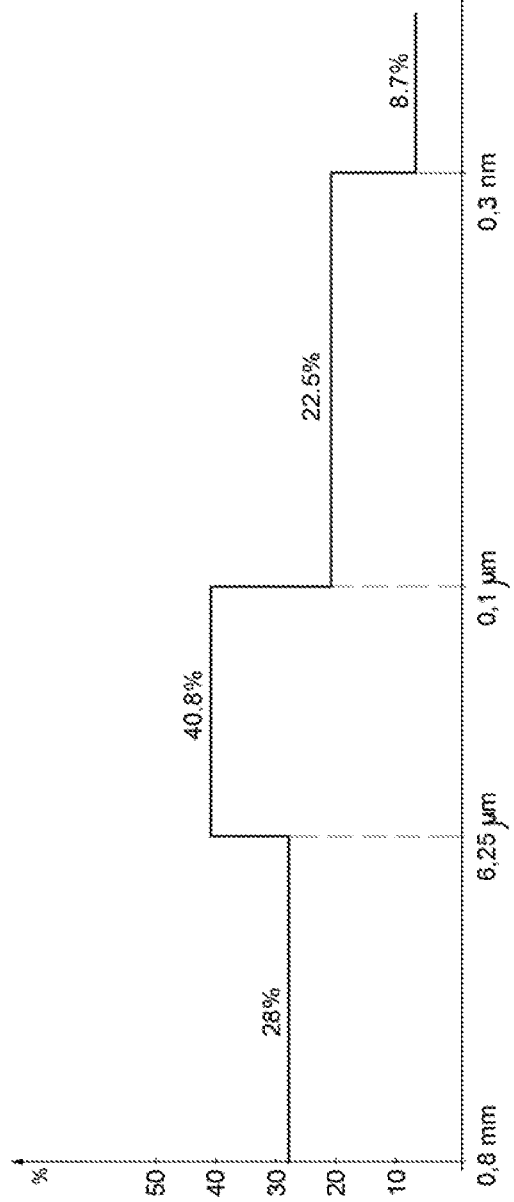
FIG. 5 is a graph which illustrates, in percentage, the ranges of the pores having a given diameter in the material according to a specific embodiment of the material according to the present invention expressed as % of space occupied by the pores as a function of their diameter.
Figure 6:
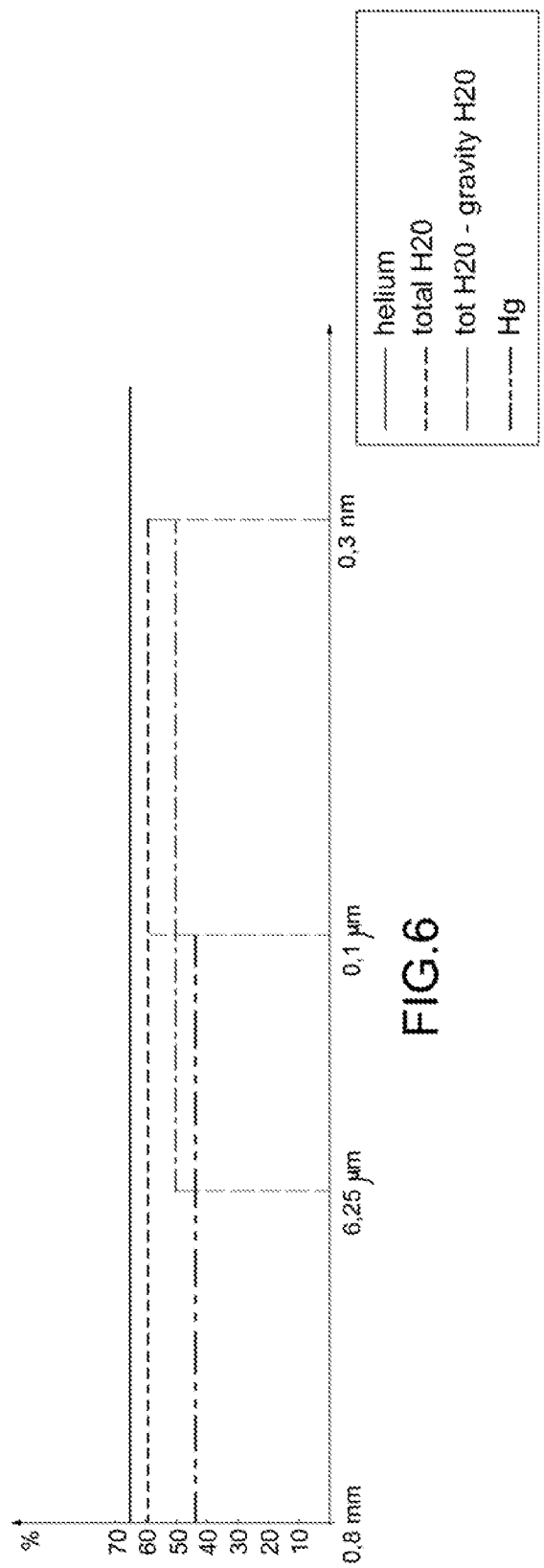
FIG. 6 is a graph which indicates the data relative to the porosity of a specific embodiment of the material according to the present invention obtained with different experimental tests indicated below which lead to the synthesis shown in FIG. 5.

FIG. 5 is a graph which represents an approximation of the porosity spectrum of the material 1. In view of what is illustrated in FIG. 5, the material 1 has a substantially linear distribution of the pores per space occupied as a function of the diameter. Advantageously, the material 1 has:
an overall porosity ranging from 50% to 80%, in particular from 60% to 70%;
approximately 28% of the total volume of the pores is occupied by pores having a diameter ranging from 0.2 mm to 6.25 μm;
approximately 40.8% of the total volume of the pores is occupied by pores having a diameter ranging from 6.25 μm to 0.1 μm;
approximately 22.5% of the total volume of the pores is occupied by pores having a diameter ranging from 0.1 μm to 0.3 nm; and
approximately 8.7% of the total volume of the pores is occupied by pores having a diameter smaller than 0.3 nm, in particular ranging from 0.3 nm to 140 μm (size of the helium molecule).

The data relative to the pores of the material 1 indicated above were obtained by using and combining with one another the following three methods:
with helium pycnometer;
with mercury pycnometer;
by experimental test with water.

The use of the three different methods allows the best approximation of the results obtained with respect to the real sample; in fact, using different saturation means it is possible to investigate with greater accuracy the percentage of pores within a given dimensional range, according to the liquid used to saturate the sample.

In particular, the tests performed with the helium pycnometer were carried out to obtain the overall porosity of the material 1, since the helium is able to penetrate also pores with smaller dimensions (in the order of picometres) of the material.

The experimental tests performed with water, according to the methods we will illustrate in detail below, were carried out to identify the percentage of pores with dimensions such as to prevent the percolation of gravity water outside the material.

The tests performed with the mercury pycnometer were carried out to identify the percentage of pores with dimensions ranging from 6.25 µm to 0.1 µm.

It is observed that the tests performed with the mercury pycnometer are not considered reliable for pores with a diameter smaller than 0.1 µm, since the mercury under pressure tends to break the pores and the interconnection channels.

The dimension of 6.25 µm is the mean dimension below which the water is not able to percolate under the effect of the force of gravity and corresponds substantially to the loam-clay passage dimension.

The test with helium pycnometer was performed by AccuPyc II 1340 (Micrometrics Company) with a precision of ±0.01%. Two samples were tested and the two tables below show the parameters and results obtained for the two samples of the material.

| HELIUM PYCNOMETER - TEST 1 - SAMPLE 1 | |
| --- | --- |
| Geometric volume of the rock sample [cm$^3$] ($G_{VS}$) | 16.40 |
| Weight of the rock sample [g] ($W_{RS}$) | 15.68 |
| Volume of the rock sample measured with pycnometer [cm$^3$] ($V_{RS}$) | 5.76 |
| Weight of the powdered sample [g] ($W_{PS}$) | 5.44 |
| Volume of the powdered sample measured with pycnometer [cm$^3$] ($V_{PS}$) | 1.98 |
| Bulk rock density of the sample [g/cm$^3$] ($B_{RD} = W_{RS}/G_{VS}$) | 0.96 |
| Density measured with pycnometer [g/cm$^3$] ($D_P = W_{RS}/V_{RS}$) | 2.72 |
| Grain density measured with the powdered sample [g/cm$^3$] ($D_{GP} = W_{PS}/V_{PS}$) | 2.75 |
| Effective porosity % ($P_E = ((G_{VS} - V_{RS})/G_{VS}) \times 100$) | 64.85 |
| Total porosity % ($P_T = ((W_{PS}/B_{RD} - V_{PS})/(W_{PS}/B_{RD})) \times 100$) | 65.22 |
| Non effective porosity % ($P_{NE} = ((V_{RS} - W_{RS} \times V_{PS}/W_{PS})/G_{VS}) \times 100$) | 0.37 |

| HELIUM PYCNOMETER - TEST 2 - SAMPLE 2 | |
| --- | --- |
| Geometric volume of the rock sample [cm$^3$] ($G_{VS}$) | 16.23 |
| Weight of the rock sample [g] ($W_{RS}$) | 15.68 |
| Volume of the rock sample measured with pycnometer [cm$^3$] ($V_{RS}$) | 5.74 |
| Weight of the powdered sample [g] ($W_{PS}$) | 5.44 |
| Volume of the powdered sample measured with pycnometer [cm$^3$] ($V_{PS}$) | 1.98 |
| Bulk rock density of the sample [g/cm$^3$] ($B_{RD} = W_{RS}/G_{VS}$) | 0.97 |
| Density measured with pycnometer [g/cm$^3$] ($D_P = W_{RS}/V_{RS}$) | 2.73 |
| Grain density measured with the powdered sample [g/cm$^3$] ($D_{GP} = W_{PS}/V_{PS}$) | 2.75 |
| Effective porosity % ($P_E = ((G_{VS} - V_{RS})/G_{VS}) \times 100$) | 64.65 |
| Total porosity % ($P_T = ( (W_{PS}/B_{RD} - V_{PS})/(W_{PS}/B_{RD}) ) \times 100$) | 64.87 |
| Non effective porosity % ($P_{NE} = ((V_{RS} - W_{RS} \times V_{PS}/Wp_S)/G_{VS}) \times 100$) | 0.22 |

The experimental tests performed with the helium pycnometer highlighted that the material 1 has an effective porosity of approximately 65%.

To investigate the range of the pores with diameter up to 0.3 nm (i.e. up to the dimension of the water molecule) an experimental test was performed on a sample 3 of material 1.

Furthermore, said experimental test also allows verification of the capillary ascension speed of the liquid inside the material 1.

The experimental test in question comprises the following steps:

weigh a sample of the dry material 1 $P_C$;
completely immerse the sample of the material 1 in water;
leave the sample of the material 1 in immersion for at least 24 hours;
take the sample of material 1 from the water and weigh it so as to obtain the weight of the sample saturated by immersion ($P_{SI}$);
leave the sample to dry completely and weigh the sample repeatedly until the weight remains unchanged over a period of 48 hours (and indicatively equivalent to the weight of the dry sample);
immerse the base of the sample for 1 cm in a basin of water at an external temperature T=24° C. and with a relative ambient humidity U=54%;
using a thermocamera to identify the ascent of the cold thermal front on the outer surface of the sample (the ascent of the thermal front corresponding substantially to the ascent of the liquid by capillarity inside the sample);
leave the sample immersed in the basin until saturation;
take the sample from the basin;
weigh the sample so as to identify the weight of the sample saturated by capillarity ($P_{SC}$).

| EXPERIMENTAL TEST WITH WATER - TEST 3 - SAMPLE 3 | |
| --- | --- |
| Geometric volume of sample (parallelepiped with the following dimensions: height 9.0 [cm], depth 8.8 [cm], base 6 [cm]) [cm$^3$] (GVS) | 475 |
| Weight of sample [g] ($P_C$) | 388 |
| Weight of sample saturated by immersion [g] ($P_{SI}$) | 670 |
| Weight of sample saturated by capillarity [g] ($P_{SC}$) | 627 |
| Skeleton volume % | 40.5 |
| Pores volume % | 59.5 |

Figure 7:
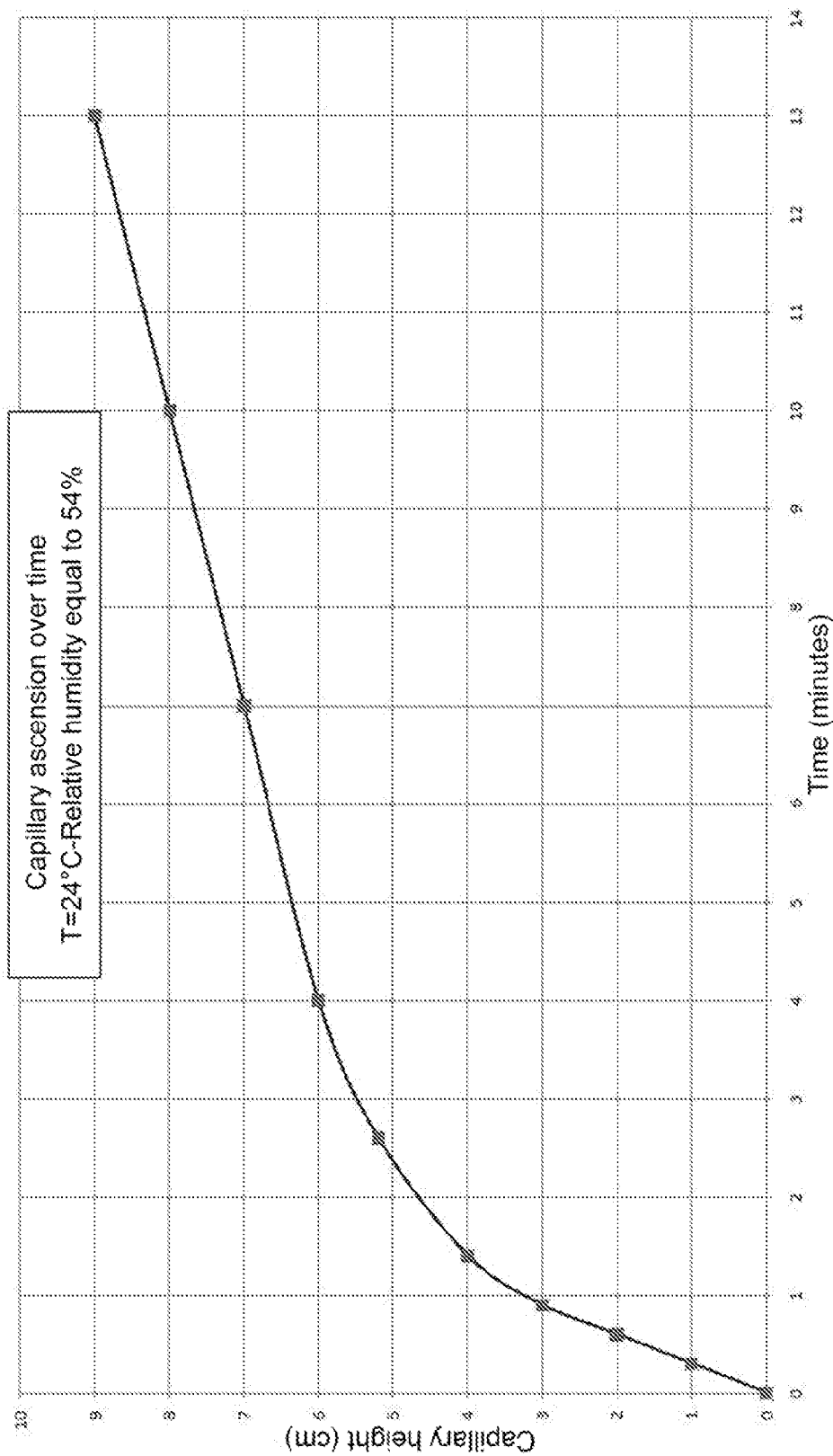
FIG. 7 is a graph which illustrates the capillary ascension speed of the water in a sample of a specific embodiment of the material according to the present invention.

FIG. 7 illustrates the graph of the capillary ascension speed of the liquid inside the sample as identified by the thermocamera. From FIG. 7, it can be noted that over a period of approximately 13 minutes the sample is substantially completely saturated with the water by capillarity (height 9 cm equivalent to the height of the sample used). It is observed that the ratio between the weight of the sample saturated by immersion and the weight of the sample saturated by capillarity (after approximately 13 minutes) is 93%.

Therefore, the material 1 according to the present invention can be substantially completely saturated by capillarity in a short time.

With this test it is also possible to verify the interconnection between the pores, which communicate with each other, otherwise saturation of the sample would not be possible.

By means of this test it is also possible to verify that the speed of capillary ascent of water inside the material ranges from 0.1 mm/s to 1 mm/s.

FIGS. 8, 9 and 10 illustrate the results of three standard tests in compliance with the ISO 15901-1 standards with a mercury pycnometer. For all three tests the conditions are the following:

| ANALYTICAL CONDITIONS | |
| --- | --- |
| Maximum test pressure [MPa] | 200 |
| Increase speed | 6 |
| Increase method | Pascal Stepwise |
| Decrease speed | 6 |
| Decreased method | Pascal Stepwise |
| Temperature of test [° C.] | 24.9998 |
| Mercury density @ test [g/cm³] | 13.5340 |
| BLANK & DILATOMETER INFORMATION | |
| Blank Max pressure [MPa] | 200 |
| Blank Increase speed | 6 |
| Blank Increase method | Pascal |
| Blank Decrease speed | 6 |
| Blank Decrease method | Pascal |
| Dil. Number | 546 |
| Dil. Type | CD3 |
| Dil. Cone length [mm] | 21 |
| Dil. Electrode gap [mm] | 5 |
| Dil. Stem radius [mm] | 1.5 |
| Dil. Weight [g] | 43.5 |
| Temperature of blank [° C.] | 25 |
| Mercury density @ blank [g/cm³] | 13.5340 |
| Blank filling volume [mm³] | 572.265 at P < 1 Pa |
| Starting hydr. Blank press. [MPa] | 0.01426 |
| (Dil + Hg) weight [g] | 248.47 |

Figure 8A:
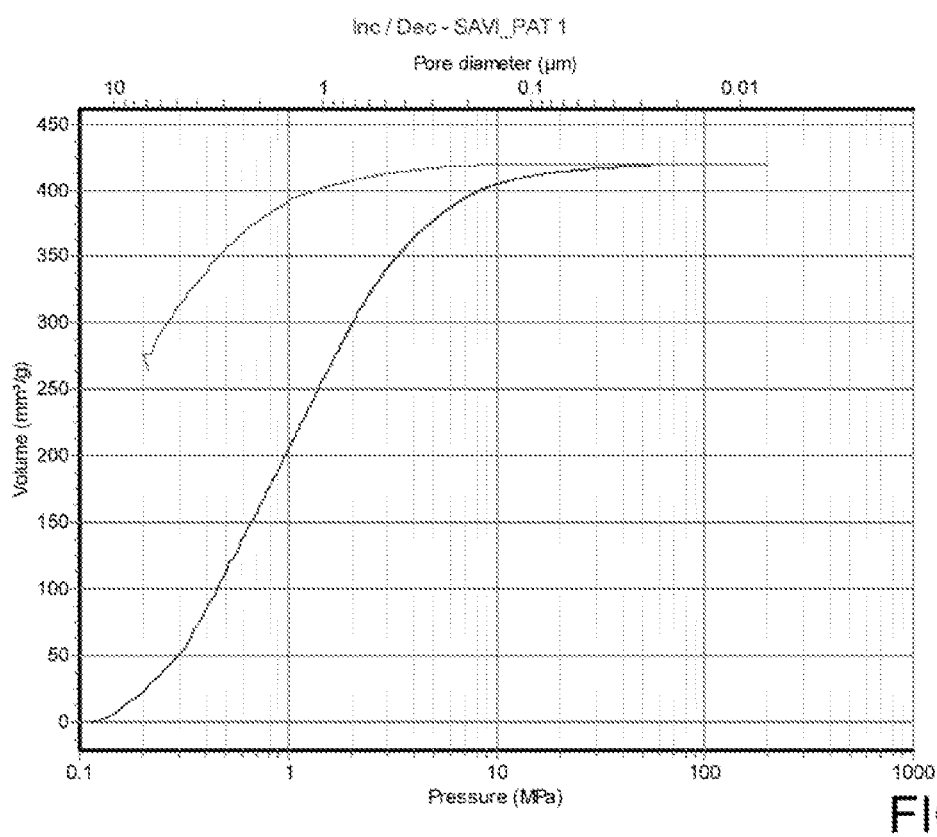
FIGS. 8a, 8b and 8c illustrate the graphs relative to the porosity obtained by means of a first test with mercury pycnometer on a sample of a specific embodiment of the material according to the present invention.
Figure 8B:
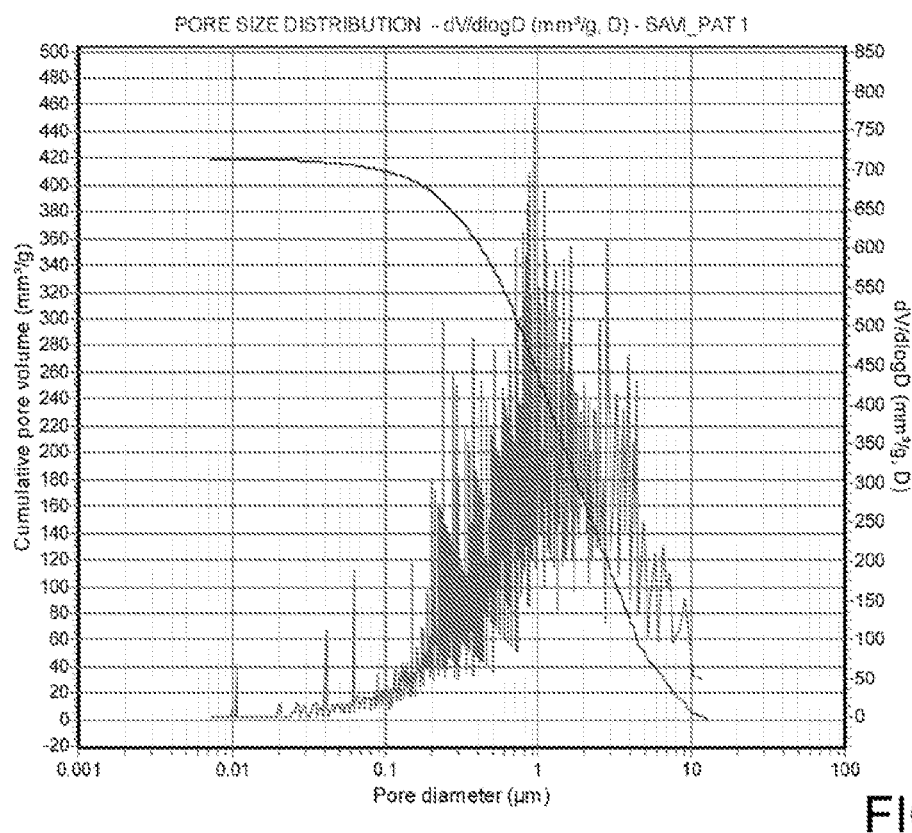
Figure 8C:
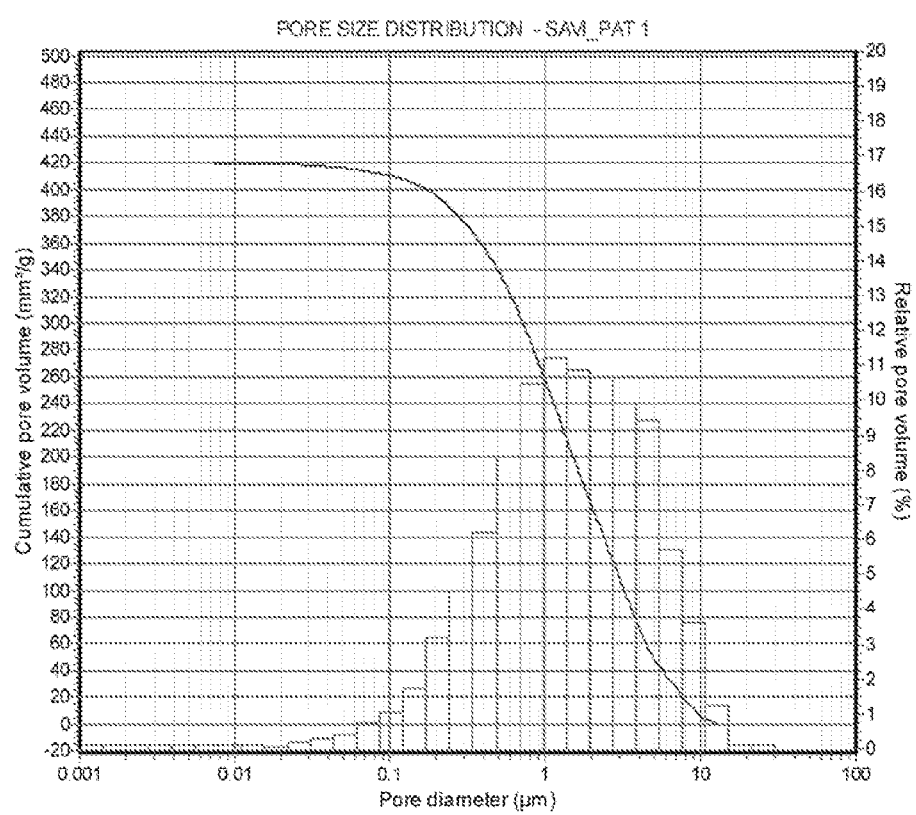

FIGS. 8a, 8b and 8c illustrate graphs relative to the results obtained by performing a test with the following initial parameters:

| MERCURY PYCNOMETER - TEST 4 - SAMPLE 4 TEST INFORMATION | |
| --- | --- |
| Sample mass [g] | 0.55 |
| Sample skeleton density [g/cm³] | 1.76 |
| Mercury surface tension [N/m] | 0.48 |
| Mercury contact angle [°] | 140.0 |
| Test filling Volume [mm³] | 572 at P < 1 Pa |
| Starting hydr. Press. of test [MPa] | 0.0143 |
| (Dil + Hg + Sample) weight [g] | 241.66 |
| Corrected weight (Dil + Hg + Sample) [g] | 241.664 |

Figure 9A:
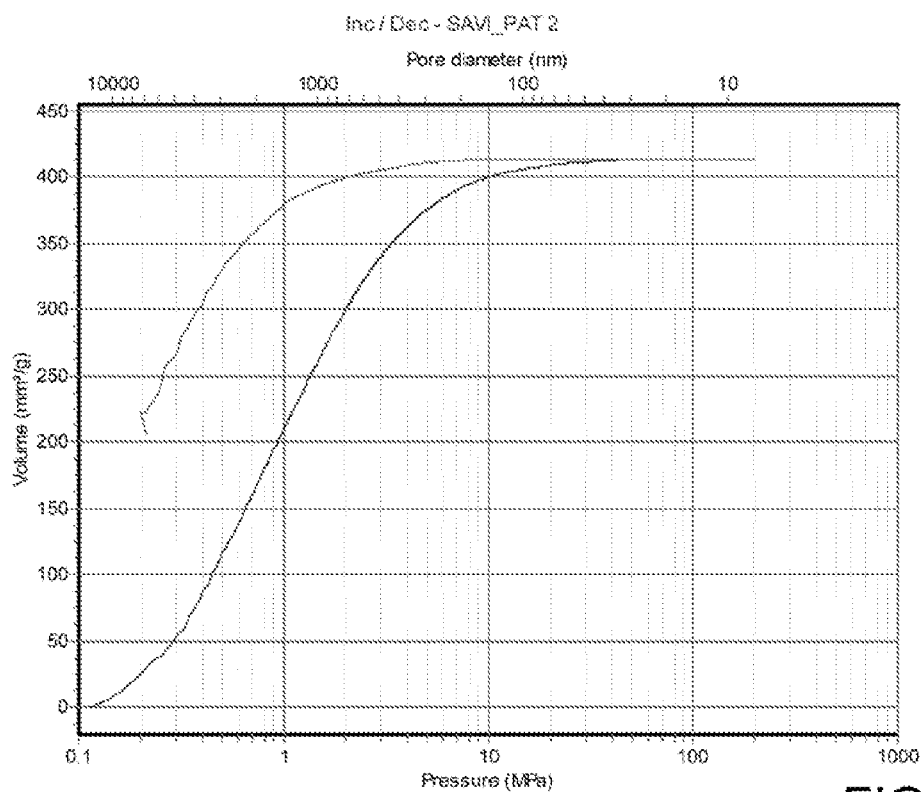
FIGS. 9a, 9b and 9c illustrate the graphs relative to the porosity obtained by means of a second test with mercury pycnometer on a sample of a specific embodiment of the material according to the present invention.
Figure 9B:
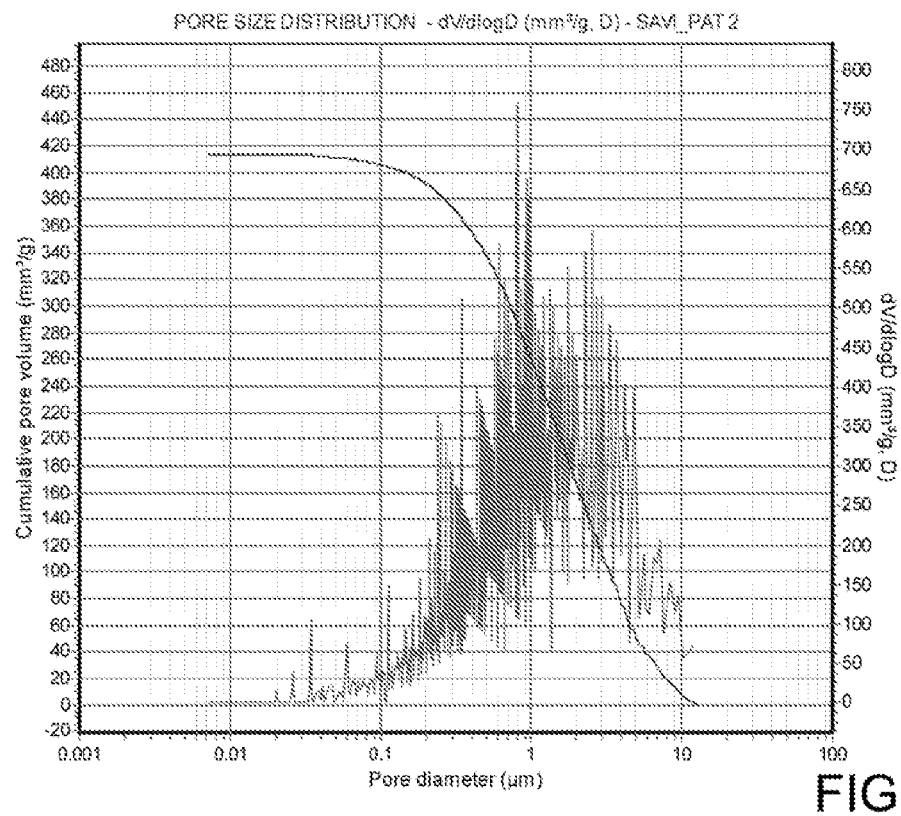
Figure 9C:

FIGS. 9a, 9b and 9c illustrate the graphs relative to the results obtained by performing a test with the following initial parameters:

| MERCURY PYCNOMETER - TEST 5 - SAMPLE 5 TEST INFORMATION | |
| --- | --- |
| Sample mass [g] | 0.38 |
| Sample skeleton density [g/cm³] | 1.845 |
| Mercury surface tension [N/m] | 0.48 |
| Mercury contact angle [°] | 140.0 |
| Test filling Volume [mm³] | 572 at P < 1 Pa |
| Starting hydr. Press. of test [MPa] | 0.0143 |
| (Dil + Hg + Sample) weight [g] | 243.93 |
| Corrected weight (Dil + Hg + Sample) [g] | 243.934 |

Figure 10A:
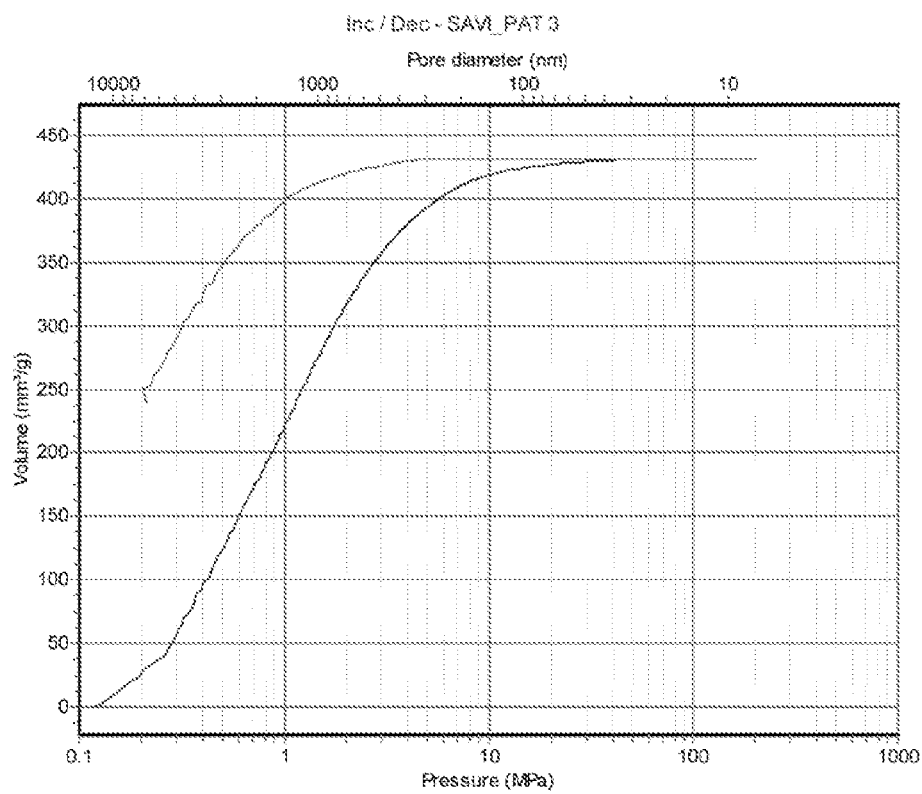
FIGS. 10a, 10b and 10c illustrate the graphs relative to the porosity obtained by means of a third test with mercury pycnometer on a sample of the material of a specific embodiment according to the present invention.
Figure 10B:
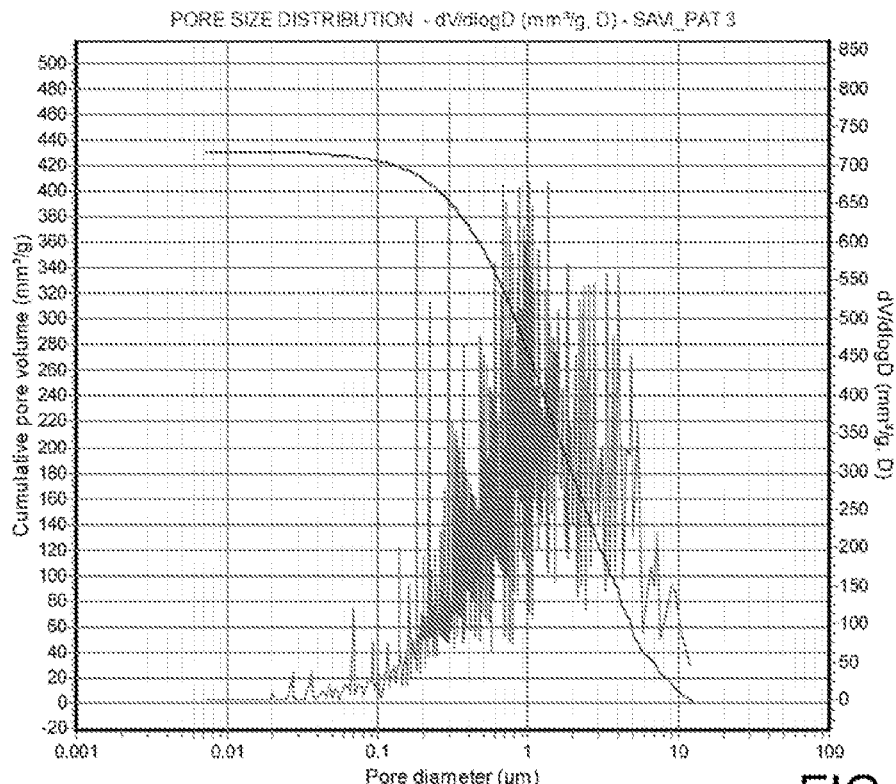
Figure 10C:
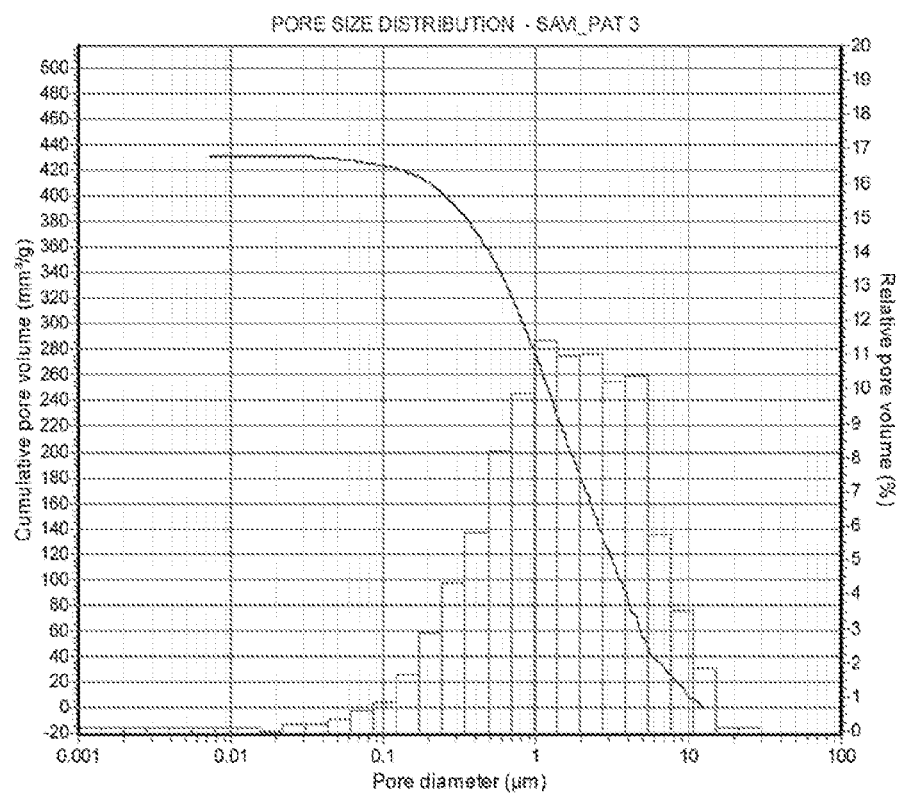
Figure 11A:
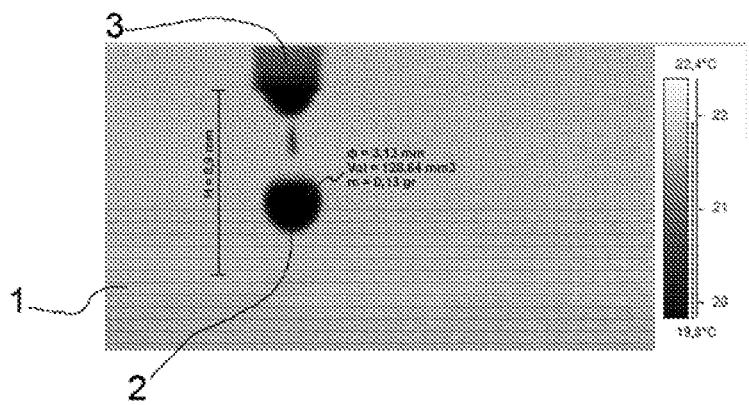
FIGS. 11a to 11g illustrate a sequence of images obtained with a stroboscopic camera relative to the absorption of a drop of water by the surface of a specific embodiment of the material according to the present invention.
Figure 11B:
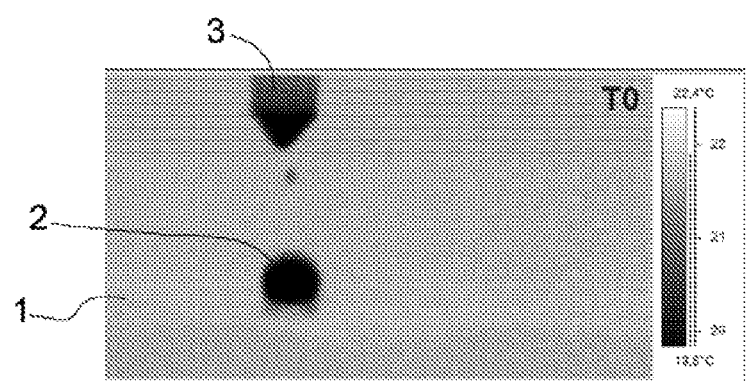
Figure 11C:
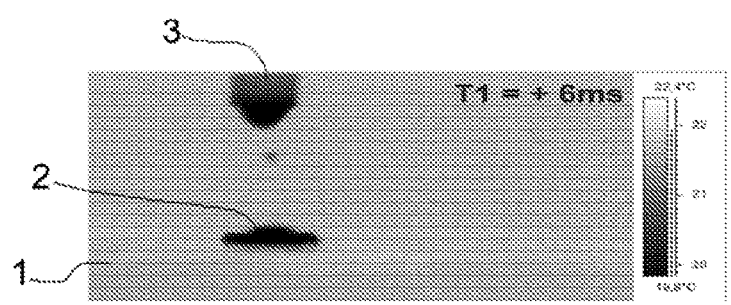
Figure 11D:
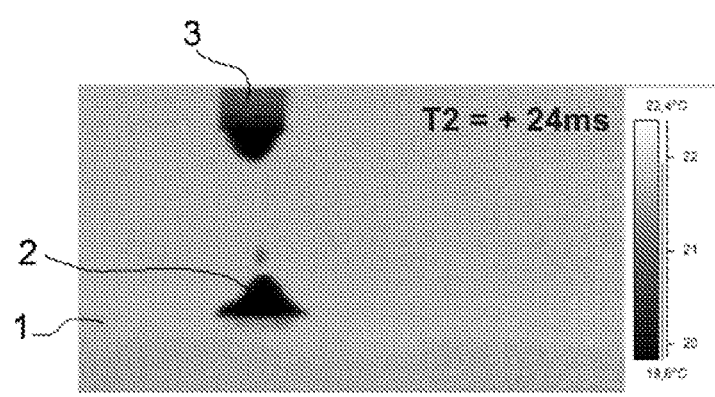
Figure 11E:
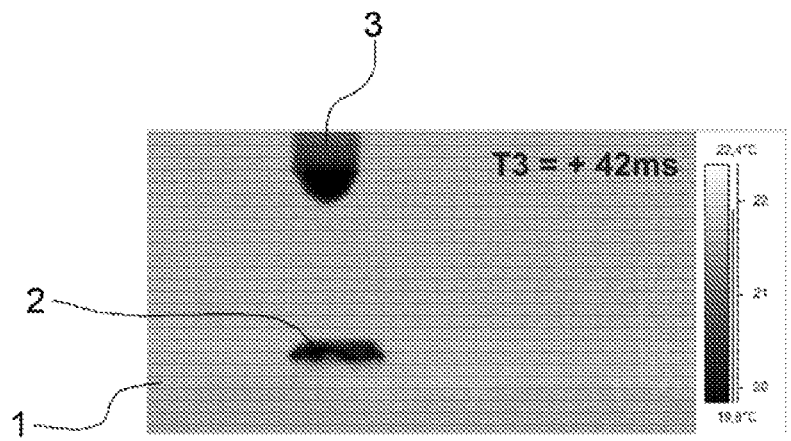
Figure 11F:
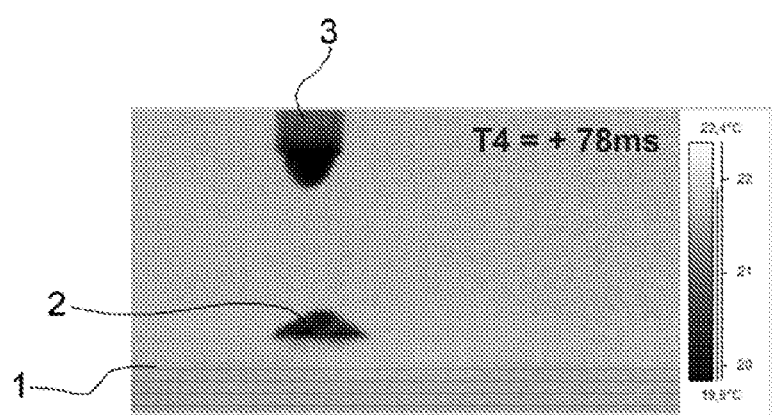
Figure 11G:
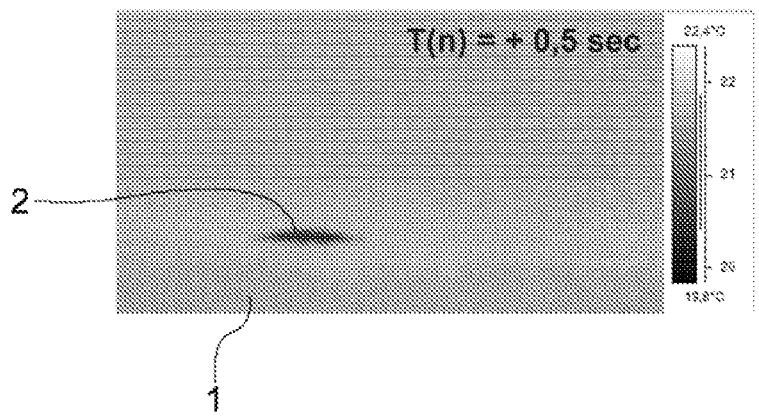

FIGS. 10a, 10b and 10c illustrate the graphs relative to the results obtained by performing a test with the following initial parameters:

| MERCURY PYCNOMETER - TEST 6 - SAMPLE 6 TEST INFORMATION | |
| --- | --- |
| Sample mass [g] | 0.29 |
| Sample skeleton density [g/cm³] | 1.99 |
| Mercury surface tension [N/m] | 0.48 |
| Mercury contact angle [°] | 140.0 |
| Test filling Volume [mm³] | 572 at P < 1 Pa |
| Starting hydr. Press. of test [MPa] | 0.0143 |
| (Dil + Hg + Sample) weight [g] | 245.09 |
| Corrected weight (Dil + Hg + Sample) [g] | 245.094 |

It is observed that the percentage value indicated in FIG. 5 relative to the porosity measured with mercury pycnometer is the mean of the values obtained by the three different tests indicated above.

It should be remembered that the experimental values obtained by means of the mercury pycnometer test are considered reliable within the pore diameter range up to 0.1 μm, in fact below this value the mercury under pressure breaks the pores and the smallest interconnection conduits of the sample.

The material 1 of the type described above has a porosity ranging from 50% to 80%. Advantageously, the porosity of the material 1 ranges from 60% to 70%; in which at least 70% of the volume of the total volume of the pores is occupied by pores having a diameter smaller than 6.25 μm.

In particular, between 24% and 32% of the total volume of the pores is occupied by pores having a diameter ranging from 0.8 mm to 6.25 μm. Advantageously approximately 28% of the total volume of the pores is occupied by pores having a diameter ranging from 0.8 mm to 6.25 μm.

Preferably, between 36% and 44% of the total volume of the pores is occupied by pores having a diameter ranging from 6.25 μm to 0.1 μm. Advantageously approximately 40% of the total volume of the pores is occupied by pores having a diameter ranging from 6.25 μm to 0.1 μm.

Between 15% and 34% of the total volume of the pores is occupied by pores having a diameter ranging from 0.1 μm to 0.3 nm. In particular approximately 22% of the total volume of the pores is occupied by pores having a diameter ranging from 0.1 μm to 0.3 nm.

Between 6% and 10% of the total volume of the pores is occupied by pores having a diameter smaller than 0.3 nm. Advantageously approximately 8% of the total volume of the pores is occupied by pores having a diameter smaller than 0.3 nm.

Example 3

Surface Wettability of the Material Obtained According to Example 1

FIGS. 11a to 11g illustrate a sequence of images obtained with a stroboscopic camera which illustrates, over time, the absorption of a drop 2 of water by the outer surface of an example of the material 1.

In particular, the drop 2 is made to fall by gravity onto the material 1 and is generated at a distance of 8.9 mm from the surface of the material 1 by means of a dropper 3, which is capable of releasing a drop with diameter 3.13 mm, mass 0.13 g and volume 128.64 mm³. From the sequence of the FIGS. 11a to 11g, it can be observed that in 0.5 sec the drop 2 is completely absorbed by the material 1.

Example 4

Litmus Test on a Sample of Material Obtained According to Example 1

Figure 12:
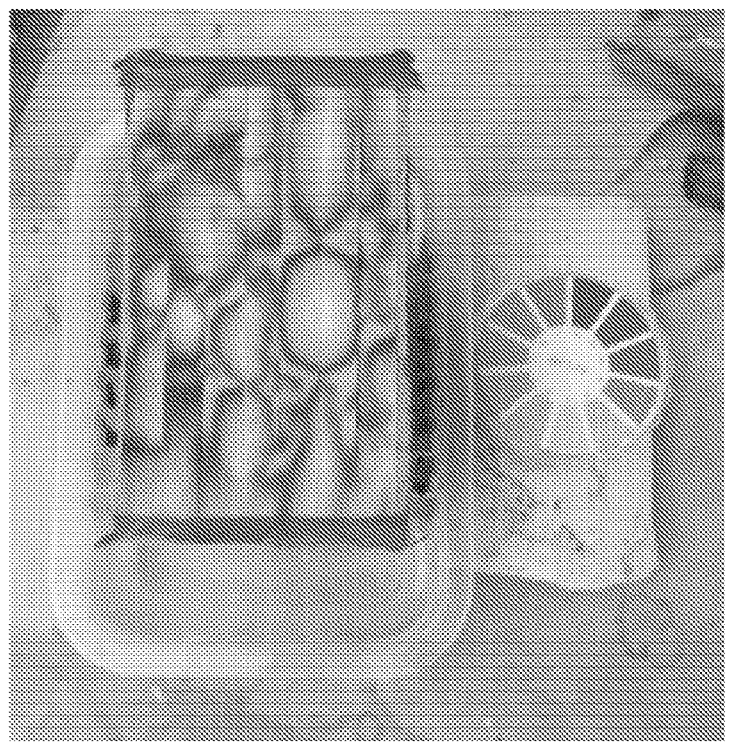
FIG. 12 is a plan view of a Litmus test on a sample of the material according to the present invention when it is saturated with liquid.

FIG. 12 is an overhead view of an example of the material 1 saturated with water and on which litmus papers are placed for identification of the pH. From FIG. 12 it can be observed that these papers show patches which indicate dissociation of the water absorbed from the material 1.

Therefore, it can be observed that the material 1 is capable of dissociating liquid (horizontal variation of the pH), in particular water, and of creating a voltage variation ΔV inside the material 1.

Example 5

Non-Influence of the Force of Gravity in Saturation by a Liquid of a Sample Obtained According to Example 1

FIGS. 13a-13d show a sample 15 into which water is introduced in a substantially central position. FIGS. 13b-13d are images obtained by thermocameras and illustrate the sample 15 at moments t=t0, t=t1 and t=t2 respectively in which t0<t1<t2. As illustrated in FIGS. 13a-13d, the water is brought into contact with the sample 12 in a central area of a wall substantially perpendicular to a supporting surface. In FIGS. 13b to 13d it can be observed that the water front inside the sample 15 expands radially in a substantially uniform manner. In fact, given the particular porosity of the material 1 the effect of the gravity on the water absorbed by the material 1 is substantially uninfluential; in other words, the water expands radially also upwards in a substantially uniform manner.

Example 6

Occurrence of a Depression Inside a Sample Obtained According to Example 1

By means of a further test in which a vacuum meter was positioned inside a cylindrically-shaped sample (not illustrated) of the material 1 at an external temperature of approximately 23.5° C. and a relative humidity of 50%, it was found that inside the sample a depression of at least 40 mbar was created. In other words, inside the material 1 wetted with liquid a depression is created which enables absorption of further liquid from the outside.

Advantages of the Material 1

Gerald H. Pollack in "The Fourth Phase of Water, Beyond Solid Liquid Vapor" teaches that in certain conditions water is arranged in a "liquid crystalline" state which has different characteristics from ordinary liquid water. In particular, when liquid water is brought into contact with hydrophilic surfaces (for example Nafion®) and exposed to external radiations (for example light, heat, infrared rays), a layer of water is formed starting from the hydrophilic surface with negative charge (OH−), and in some rarer cases a positive charge (H+), which has different characteristics with respect to normal liquid water, i.e. a layer of "liquid crystalline" water. The remaining water has the opposite charge.

According to Pollack's theories, in the case of liquid water confined to pores or hydrophilic capillary structures, areas of water in the "liquid crystalline" state can be created along the hydrophilic walls. According to this theory, the "crystalline liquid" should contribute to, and at least partially explain, the ascent of the water along the pores/capillaries against the force of gravity.

Pollack proves the existence of the "liquid crystalline" state of the water as different from that of the normal liquid state by measuring a series of characteristics which differentiate "liquid crystalline" water from liquid water including, at least:

- a different absorption curve of the light (typically higher and with even higher absorption peaks ranging from 250 to 300 nm);
- the tendency of "liquid crystalline" water to spontaneously exclude particles such as "microspheres";
- the tendency of "liquid crystalline" water to take on a negative electric charge and, in rare cases, a positive charge, and to create an opposite electric charge in the portion of water not converted into a liquid crystalline form;
- greater absorption of infrared radiation of the "liquid crystalline" water than normal liquid water;
- greater viscosity than normal liquid water.

It has further been hypothesised that the process of the passage of the normal water to "liquid crystalline" water described above is preparatory to the passage from the liquid phase to the vapour phase. It is supposed that this process of the passage of normal water to "liquid crystalline" water occurs with absorption of energy from the surrounding environment and therefore from the water itself and/or the material in contact with it, for example the hydrophilic material in question. Said energy can be luminous energy, of the infrared and also of the thermal radiation band.

In the current state of the art there are no effective materials in practical terms that exploit the above principles, capable of maximizing the evaporation of liquids, and in particular of water, and/or maximizing the dissociation of water into EZ− and H+ and/or maximizing transformation of the water from the normal liquid state to the "liquid crystalline" state.

For example, the experiments performed by Pollack generate layers of "liquid crystalline" water only to a very small extent since elements like strips or tubes of hydrophilic material are used which have limited surfaces with respect to the overall volumes of the elements. Furthermore, vis-à-vis the limited hydrophilic surface, to obtain the desired phenomenon, highly hydrophilic materials are used like Nafion, which are very expensive. Therefore, said elements do not lend themselves to maximizing the phenomenon, so as to maximize the dissociation and/or evaporation of the water. Furthermore, said materials do not lend themselves to use within bulk products.

Unlike the elements used by Pollack the material 1 has an inner surface of the pores of hundreds of $m^2$ for a volume of 250 $cm^3$. Furthermore, the fact that the surfaces of the pores are made of or coated with hydrophilic material allows the dissociation/polarization of the liquid to be maximized, in particular the water, brought into contact with the material 1, in other words maximizing the passage to the "liquid crystalline" state, promoting cooling of the material 1 as the ambient heat is substantially used for the phenomenon of dissociation/polarization.

This is possible, above all, due to the pores with an inner hydrophilic surface, with diameter ranging from 0.1 μm to approximately 0.3 nm since these pores have the smallest dimensions possible compatibly with the passage of water molecules (the water molecules should have a diameter of approximately 0.3 nm). Therefore, thanks to the pores with these dimensions, the surface in contact with the water is maximized with the volume remaining the same. It should be remembered that in general the inner surface of pores that occupy a given volume is squared as the diameter of the pores decreases. It is further observed that the smaller the pores, the greater the height of the liquid, in particular water, due to capillary ascension, in the material 1. Therefore, the material 1, having a vast range of pores with diameter between 0.1 m and 0.3 nm, allows diffuse and rapid saturation of the material 1 by the liquid.

Advantageously, the material 1 has a uniform pore spectrum ranging from $1/10$ of a millimetre to $1/100$ of a micron so as to allow a very high diffusion of the water inside the material 1. Advantageously, the pores with larger diameter allow permeability of the material 1 and rapid absorption of liquid.

In addition, in the material 1 the interconnection of the pores and the permeability over $10^{-6}$ m/sec, preferably $10^{-5}$ m/sec, influenced by the presence of pores with larger dimensions, in particular the pores ranging from 0.1 µm to 0.3 nm, ensures that the material 1 does not dry inside as the water in the smallest pores dissociates and/or evaporates. In other words, the interconnection of the pores and the permeability over $10^{-6}$ m/sec, preferably $10^-$ m/sec, ensures that the material 1 remains constantly wet inside if in contact with a liquid source and, furthermore, improves the thermal efficiency of the material which in this way is able to maximize the heat absorbed, even when introduced inside it. If the permeability and/or interconnection are different, in particular lower, the efficiency of the material 1 is reduced since the phenomenon of evaporation/dissociation of the liquid is significantly limited.

Furthermore the known experiments of Pollack only provide for passage of the liquid water to water in the "liquid crystalline" state but do not go as far as evaporation of the water and/or use of the evaporation/dissociation of the water to obtain an advantage in technical terms and/or to facilitate the production of hydrogen. Furthermore, the known experiments by Pollack involve the use of materials which are typically very expensive, like Nafion.

On the basis of what has been said previously, it has been ascertained that the material 1 according to the present invention is particularly suitable for use in cooling systems, since due both to the number, distribution and interconnection of the pores it is possible to obtain an evaporation (and hydrophilic contact) surface of hundreds of m² for a sample with small dimensions, for example approximately 250 cm³ and at the same time a strong capacity to absorb liquid; in particular, due to the pores with diameter ranging from 0.1 µm to 0.3 nm, the material 1 does not dry due to the evaporation, especially when considerable heat is applied inside the material.

Advantageously, the material 1 according to the present invention is able, if wetted with a liquid (in particular water) to spontaneously lower its temperature by a few degrees (typically to temperatures in the order of the wet-bulb temperature of the surrounding air) both with respect to the external environment and with respect to the liquid with which it is saturated.

It is observed that the material 1 is able to maintain in a stable manner the temperature lower than the external environment. In other words, when the material 1 continues to be wetted at one end with liquid, it remains constantly saturated with liquid and allows the temperature difference reached to be maintained with the external environment and with the source of liquid in a stable manner over time.

It is observed that the smaller the pores, the greater the height of the liquid in the material by capillary ascent. Therefore, the material 1, which has a vast range of pores with diameter ranging from 0.1 µm to 0.3 nm, allows a diffuse and rapid saturation of the material 1 by means of the liquid.

Furthermore, the smaller the pores of the material 1, the lower the temperature at which the liquid freezes inside. Therefore, by means of the material 1 it is possible to lower, in the order of tens of degrees centigrade ° C., the freezing temperature of a liquid, in particular water, contained inside it. In other words, the material 1 can be used also in environments at low temperatures, even below 0° C.

Possible Uses of the Material 1

The material 1 according to the present invention advantageously lends itself to the following uses.

Use for Cooling.

FIG. 14 schematically illustrates a cooling system 20 comprising a cooling unit 21 (illustrated in detail in FIG. 15) which in turn comprises a plurality of modules 22 (illustrated in detail in FIG. 16) made with the material 1. Since the material 1 is rigid, in particular the rigidity of the material 1 can be modified as a function of the percentage by weight of clays with which the mixture of raw material is formed as described in detail previously, it is possible to create units which are independent and stackable so as to create structures with different more or less complex forms according to how the modules 22 are stacked.

Figure 15:
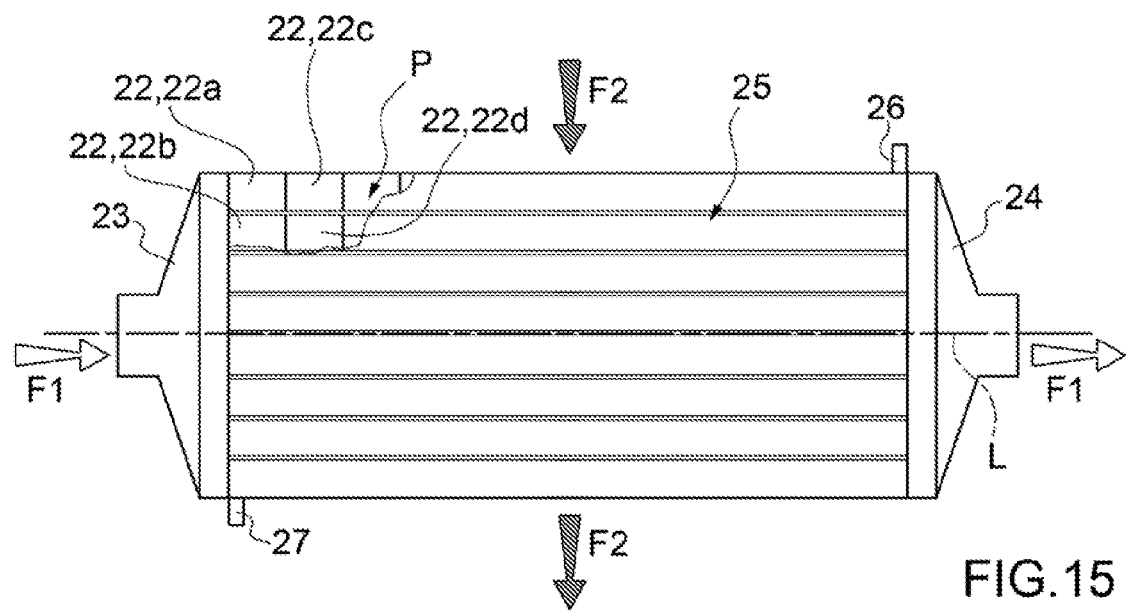
FIG. 15 illustrates a detail of FIG. 14.

In particular, according to FIG. 15, the cooling unit 21 comprises: an inlet 23 for a flow of liquid or dehumidification gas (in this example a dehumidification air flow F1) without increasing the water vapour content thereof; an outlet 24 for the air flow F1, a body 25, an inlet 26 for a flow of a gas or liquid F2 to be cooled and an outlet 27 for the flow of cooled gas or liquid F2.

The body 25 has a longitudinal axis L. The body 25 is formed by a plurality of modules 22. The body 25 is interposed between the inlet 23 and the outlet 24 so that the air flow F1 flows longitudinally along the body 25. The body 25 is interposed between the inlet 26 and the outlet 27 so that the air flow F2 passes through the body 25 transversally to the axis L.

The body 25 comprises a plurality of walls P which are formed by means of the modules 22 and are positioned next to one another. According to FIG. 16, the modules 22 of a wall P are stacked on one another.

Each module 22 comprises one or more conduits 28, each of which is configured to be crossed by the flow of gas or liquid F2. Each conduit 28 is coated inside so as to allow the exchange of heat and, at the same time, prevent the exchange of humidity between the material 1 of the module 22 and the flow of gas or liquid F2. Advantageously, each conduit 28 is coated by a metallic film or paint. In particular, each conduit 28 is coated with waterproof and thermally conductive material, for example copper.

Each module 22 furthermore has one or more channels 29. The conduits 28 and the channels 29 do not intersect one another.

Figure 16:
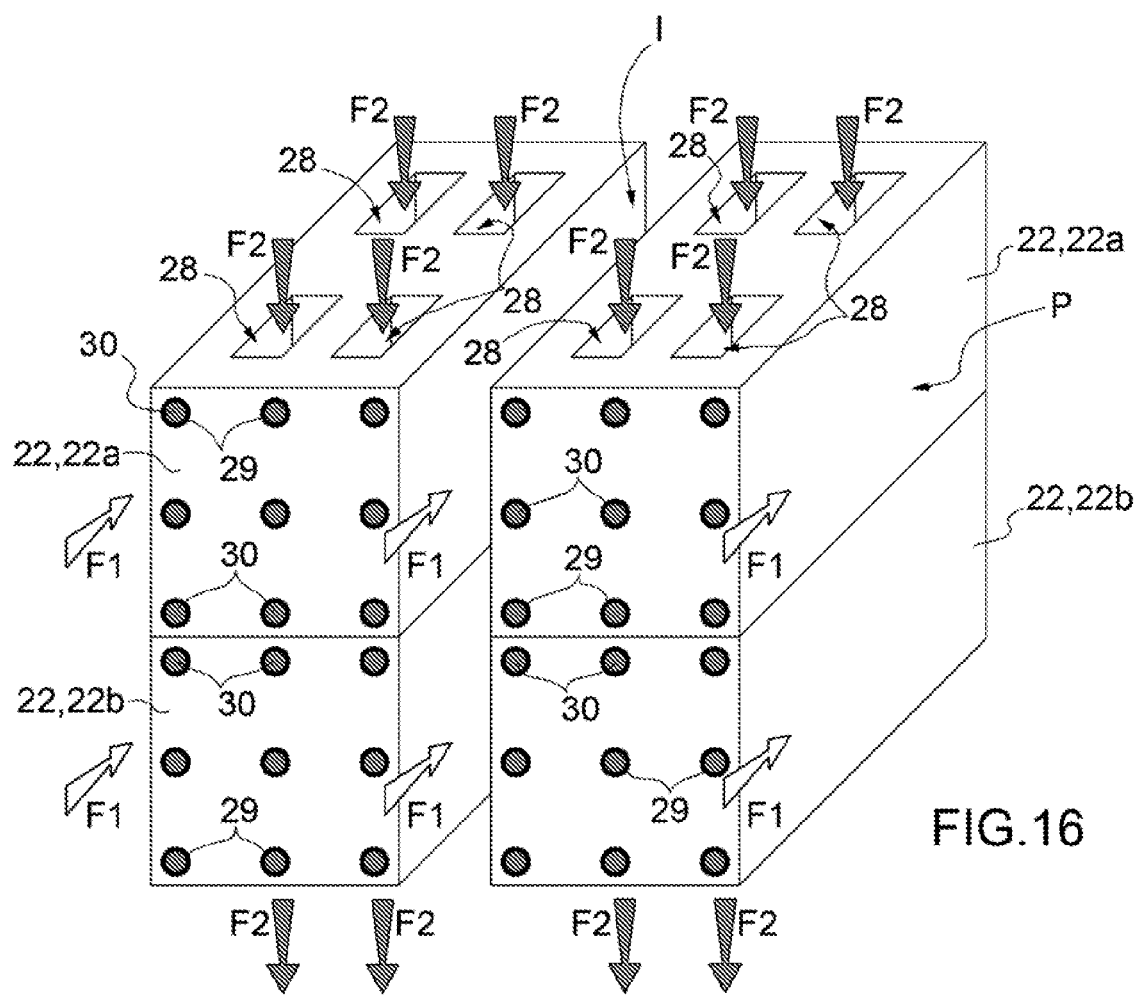
FIG. 16 illustrates a detail of FIG. 15.

As illustrated in FIG. 16, the modules 22 of the walls P are identical to one another, so that the conduits 28 of the adjacent modules (for example 22a and 22b) communicate with one another. The modules 22 of the walls P are identical to one another, so that the channels 29 of the adjacent modules (for example 22a and 22c) of a wall P communicate with one another.

As illustrated in FIG. 16, the modules 22 of the walls P are made so that the flow of gas or liquid F2 flows inside the conduits 28, while the flow of air F1 flows outside the modules 22, in contact with outer surfaces. In particular, the flow of air F1 flows in the interspace I between two adjacent walls P.

Advantageously, the cooling unit 21 comprises sponges 30, which are inserted inside the channels 29. The sponges 30 are of the type generally indicated by the term sponge cloth and are made of cotton-cellulose.

In use, the sponges 30 are kept wet by means of a source of liquid, in particular water, not illustrated. It is observed that the liquid must be without contaminating particles which could clog the pores of the material 1. The material 1 of the modules 22 absorbs the liquid from the sponges 30 by suction so as to saturate the entire module 22 and the entire wall P with the liquid. The use of the sponges 30 is particularly advantageous since, if the module 22 has a crack or is partially broken in the vicinity of the channel 22, the liquid does not accidentally leak out but remains in the sponge 30. Furthermore, if the material 1 is fractured, the sponge 30 does not transfer the liquid to the fractures of the material 1. In other words, via the use of the sponges 30 the material 1 absorbs the liquid solely by suction from the sponges 30, thus avoiding the circulation of free liquid inside the cooling unit.

The flow of gas or liquid F2 is conveyed into the conduits 28 and through the walls P so as to exchange heat with the material 1 of the modules 1. It is observed that, as described previously, the material 1 of the modules 22 cools in contact with the liquid to the wet-bulb temperature of the surrounding air F1. Therefore, if the flow of gas or liquid F2 is an air flow, the air flow F2 when passing through the conduits 28 exchanges heat with the material 1, cooling but not absorbing the humidity, therefore the air flow F2 does not acquire further humidity since the walls of the conduits 28 are covered with waterproof and thermally conductive material.

As already mentioned, this is particularly advantageous for cooling an air flow F2 which is to be used in environments where it is necessary to prevent the formation of humidity, for example inside data centers.

Advantageously, the air flow F1 is made to flow in the interspace I between the walls P and outside the modules 22 so as to remove the humidity created inside the body 25 due to the phenomenon of evaporation of the liquid inside and/or along the surface of the modules 22. The air flow F1 is then conveyed towards the outside.

Given the low cost and overall dimensions of the cooling unit 21, two or more cooling units 21 can be used in cascade so as to reach temperatures even below the wet-bulb temperature of the external air by the sole evaporation of water, without the use of units based on the Carnot cycle, which requires a considerable energy supply. For example, a cooling unit 21 can be used to cool external air instead of internal air to a temperature near to the wet-bulb temperature of the external air, without increasing the water content thereof. This air flow can be in turn introduced into a subsequent cooling unit 21 in cascade instead of the external air, the temperature will be further reduced by evaporation of the water, and thus a third air flow can be brought below the wet-bulb temperature of the external air. Further improvements could be possible by adding further cooling units 21 in cascade. In theory, it should also be possible to improve the efficiency by pre-treating the incoming air with the air leaving the various cooling units 21, but this would require air-air exchangers.

The use of a cooling unit 21 can be advantageously applied also if the cooling system 20 described is used with conventional systems based on the Carnot cycle which, on their own, require considerable energy. It is observed for example that FIG. 14 illustrates a particular application of the cooling unit 21, in which the cooling unit 21 is used to pre-cool an air flow F1 to be sent to a conditioner 31 to cool a data center.

The circuit of FIG. 14 absorbs and conveys the air flow F1 inside the cooling unit 21 to remove the humidity formed inside the body 25.

Compared to the cooling systems of known type, for example adiabatic systems that use an air flow which directly laps an evaporating surface, like sponges soaked in water, the cooling system 20 has the advantage of not requiring an air-air heat exchanger to cool an air flow without increasing the humidity thereof due to the evaporation of the water, or an air-water exchanger to cool water. Furthermore, advantageously in some conditions the cooling system 20 has the advantage of bringing the air flow F2 below the wet-bulb temperature of the air flow F1 (minimum limit that can be reached by means of the normal cooling systems by evaporation of water). Furthermore, advantageously, the fact that it does not require an air-air or air-water-air exchanger and the inexpensiveness of the material 1 could make it feasible in practice to use several cooling systems 20 in cascade, which makes it possible to achieve even greater temperature drops than those of the single cooling system 20.

As illustrated previously, the material 1 can be advantageously applied not only in cooling but also in the following environments: suction of liquids; absorption of humidity; "Seebeck effect" energy battery; production of hydrogen.

Use for the Production of Hydrogen from Water and Solar/Electromagnetic/Heat Radiation It has been observed that when the material 1 is in contact with water and exposed to sources of radiation, for example heat, at least on the surface of the material 1 zones with different pH form (as illustrated in FIG. 12) so that in some areas characterized by acid pH these are due to the presence of water with hydrogen ions (H+) in excess, in other areas with basic pH the presence of OH− ions in excess is probable. It is hypothesized that this phenomenon is due to the fact that the material 1 allows at least part of the water absorbed and in contact with the hydrophilic material to pass to the "liquid crystalline" state according to Pollack's theory, and this is favoured by the contact of at least internal parts of the material with radiation like heat, also waste heat from other processes, or solar radiation.

If it were possible to use the water component with hydrogen ions in excess (H+), hydrogen (H2) could be produced by adding electrons. This procedure could require less additional energy than the currently known systems.

In particular, since the material 1 allows dissociated water to be obtained, in this case as illustrated in FIG. 12 with a pH lower than seven in the central part of the pores, and with pH greater than 7 along the walls of the pores, when the water reaches the evaporating surface of the material 1 it tends to be arranged in patches, some with pH lower than seven, and others with pH higher than 7, as can be seen in FIG. 12. Therefore, the material 1 can be used to pre-treat the water in a hydrogen production process in order to obtain process preparation water with a high hydrogen ion content.

Use for Extraction of Water from Ground/Walls/Materials with Water Present Inside by Means of an Energy Efficient Process.

Due to its hydrophilicity the material 1 tends to absorb free water through its surface, extracting it from materials less hydrophilic than the material 1 itself. The water thus extracted and raised by capillarity and brought into contact, for example, with a sponge characterized by a degree of hydrophilicity of the same order as that of the material 1, can be removed and expelled by means of the sponge. This process occurs spontaneously and without expenditure of energy apart from that absorbed by the material 1 in the form of external heat. This allows the production of systems with low energy consumption to extract water, for example from clayey ground, both in order to dry it, for example prior to civil engineering works, or to extract water for irrigation and/or other purposes from clayey ground where the means today available require considerable energy expenditure.

Use for Filtering of Water and/or Modification of the Composition of Aqueous Solutions by Means of Energy Efficient Process.

The process described previously, which allows both the free water and the water present in materials which are less hydrophilic than the material 1 to be extracted by capillarity and which then allows the passage of this capillary water through the sponge described above transforming it into gravity water, changes the chemical composition of the water extracted (i.e. the chemical composition of the starting water) with respect to the water recovered via the circuit described above.

FINAL CONSIDERATIONS

From what has been said above, it follows that the material 1 enables maximization of the evaporation of liquids, such as water, and/or maximization of the dissociation of water into EZ–(OH–) and H+, in which said dissociation indicates the transformation of water from the normal liquid state to the "liquid crystalline" state.

The material 1 used inside cooling systems, which exploit the characteristics of the material 1, offers various advantages with respect to materials of known type, including the production of indirect evaporative cooling systems (or dual air-air or air-water-air circuit) which are simple and inexpensive to manufacture, do not require air-air or air-water heat exchangers and can also be economically used in cascade.

In fact, in the cooling systems of known type the cooling concerns the air in which the water is evaporated, and not the inside of a solid material. Therefore, the material 1 inside a cooling unit 21 of the type described above also enables it to perform the function of heat exchanger. In this way a separate air-air exchanger to cool air without increasing the humidity thereof or an air-water exchanger are no longer necessary since the material 1 acts both as an evaporating element and as a heat exchanger, thus producing an indirect system which is more compact, simple and inexpensive to manufacture.

A further advantage is that the material 1 absorbs a quantity of water substantially equal to the water that evaporates, unlike the traditional "adiabatic" systems in which only a part of the water introduced into the system evaporates and the remaining part is recovered or expelled. Furthermore, the water does not evaporate in direct contact with the air (like, for example, water sprayed in an air flow or water deposited on a surface lapped by an air flow), but inside the material 1 in the absence of a direct contact between the water which evaporates and an air flow.

A further difference between the "adiabatic" cooling systems of known type and the cooling system 20 or a cooling system that exploits the material 1 is that the frigories generated inside the material 1 are taken at least mainly from an area where the water is not yet in the vapour phase, unlike the other systems which use mainly the frigories generated by evaporation of the water.

At the same time, the material 1 can be advantageously used: inside water pre-treatment systems for the production of hydrogen using waste heat and/or solar radiation; in systems for extraction of water from ground/walls/materials which require external energy sources with respect to the energy which the material absorbs from the surrounding environment; systems for filtering water and/or modifying the composition of aqueous solutions by means of an energy efficient process. Furthermore, the material 1 can be used in processes that can require the evaporation/dissociation of water with low energy contribution in addition to the absorption of radiation, such as heat radiation, also from the external environment.

The invention claimed is:

1. A porous material, characterized in that it has: a porosity ranging from 50% to 80%; interconnected pores; at least a part made of a hydrophilic material; a permeability coefficient greater than $10^{-6}$ m/sec; and wherein, in a given volume of the material, the total volume of pores with a diameter ranging from 0.1 μm to approximately 0.3 nm ranges from approximately from about 15% to 34% of the total volume of the pores, and wherein the pores having a size between 10 nm and 1,000 nm make up less than 26% of total pore volume.

2. The porous material according to claim 1, wherein from 24% to 32%, of the volume of the pores is occupied by pores having a diameter ranging from approximately 0.8 mm to approximately 6.25 μm.

3. The porous material according to claim 1, wherein from 36% to 44%, of the volume of the pores is occupied by pores having a diameter ranging from 6.25 μm to 0.1 μm.

4. The porous material according to claim 1, wherein, in a given volume of the material, the total volume of pores with a diameter ranging from approximately 0.3 nm to approximately 140 pm is at least 5% of the total volume of the pores.

5. The porous material according to claim 1 wherein a percentage of interconnected pores is greater than 80%.

6. The porous material according to claim 1 wherein the material is hydrophilic and has a wettability that is such that a water drop coming into contact with the surface of the material has a contact angle that is smaller than 10°.

7. The porous material according to claim 1, wherein the permeability of the material is greater than $10^{-6}$ m/sec and smaller than $10^{-4}$ m/sec.

8. The porous material according to claim 1, wherein the ratio between the weight of a sample of material saturated through immersion in water and the weight of the same sample saturated through water capillary ascension is at least 90%.

9. The porous material according to claim 1 wherein the material is solid and the size and the relative distribution of the pores are the same when the material is dry and when the material is wetted with demineralized water.

10. The porous material according to claim 1 wherein the material is rigid.

11. The porous material according to claim 1 wherein the material is derived from materials with an argillaceous nature.

12. The porous material according to claim 11 and comprising:
    clays, which, in turn, comprise granules with a size that is smaller than 1/256 mm and have pores with a diameter of some nm and;
    loams, which have particles with a diameter ranging from approximately 1/16 mm to approximately 1/256 mm.
    sands, which have particles with a diameter ranging from approximately 2 mm to approximately 1/16 mm.

13. The porous material according to claim 2, wherein approximately 28% of the volume of the pores is occupied by pores having a diameter ranging from approximately 0.8 mm to approximately 6.25 µm.

14. The porous material according to claim 3, wherein approximately 40% of the volume of the pores is occupied by pores having a diameter ranging from 6.25 µm to 0.1 µm.

15. The porous material according to claim 4, wherein, in a given volume of the material, the total volume of pores with a diameter ranging from approximately 0.3 nm to approximately 140 pm ranges from 5% to 10%.

16. The porous material according to claim 5 wherein the material has a percentage of interconnected pores greater than 90%.

17. The porous material according to claim 16 wherein the material has a percentage of interconnected pores greater than 95%.

18. The porous material according to claim 6 wherein the material has a wettability that is such that a water drop coming into contact with the surface of the material has a contact angle that is smaller than 5°.

19. The porous material according to claim 7, wherein the permeability of the material is approximately $10^{-5}$ m/sec.

20. The porous material according to claim 8, wherein the ratio between the weight of a sample of material saturated through immersion in water and the weight of the same sample saturated through water capillary ascension is at least 93%.

21. The porous material according to claim 1, wherein the porosity ranges from 60% to 70%, at least a part of the inner surfaces of the pores is made of a hydrophilic material; and, in a given volume of the material, the total volume of pores with a diameter ranging from 0.1 µm to approximately 0.3 nm ranges from about 15% to 34% of the total volume of the pores.

22. The porous material according to claim 12, wherein the material comprises:
    30% to 50% by weight of clays,
    up to 35% by weight of loams;
    up to 35% by weight of sands; and
    below 15% by weight of calcium carbonate.

23. A method for the production of a material according to claim 1 and comprising the steps of:
    providing a starting material, in particular an argillaceous material;
    pulverizing the starting material, so as to obtain a starting powder;
    forming a mixture of raw material by mixing said starting powder with a liquid, granules capable of creating additional pores on the inside of the starting material through subtraction, the granules capable of burning and/or shift to the gaseous phase at a given temperature, and oxidizing elements;
    drying the mixture of raw material; and
    baking the raw material, so as to enable combustion and/or the passage to the gaseous phase of said granules;
    wherein, during the step of forming a mixture, the following elements are mixed:
        the starting powder in a percentage ranging from 40% to 80%, of the total weight of a solid fraction of the mixture, which means of the sum of the weights of said starting powder and of said granules and of possible oxidizing elements at the solid state;
        a first part of granules with a grain size ranging from 0.1 mm to 0.1 µm in a percentage ranging from 10% to 40% of the solid fraction of the mixture; and
        a second part of granules with a grain size ranging from 0.1 mm to 1 µm in a percentage by weight ranging from 5% to 20% of the solid fraction of the mixture.

24. The method according to claim 23, wherein the starting material comprises:
    clays, comprising granules with a size that is smaller than 1/256 mm and have pores with a diameter in the nanometer range;
    loams comprising particles with a diameter ranging from approximately 1/16 mm to approximately 1/256 mm; and
    sands comprising particles with a diameter ranging from approximately 2 mm to approximately 1/16 mm.

25. The method according to claim 23, wherein, during the step of forming a mixture of raw material, the percentage by weight of the clays is increased by adding to said starting powder kaolin granules, in a percentage by weight ranging from 5% to 10% of the solid fraction of the mixture thereby increasing up to 50% by weight of clays of said material.

26. The method according to claim 23, wherein, during the step of forming a mixture, oxidizing elements are added to said starting powder, which are capable of increasing the volume of the mixture and/or of enabling combustion and the production of oxygen when they reach a predetermined temperature.

27. The method according to claim 23, wherein the step of forming a mixture comprises the sub-steps of:
    forming a granulated preparation; and
    mixing a liquid with said granulated preparation until the mixture of raw material has a density of 0.1 Kq/cm² according to the Pocket Penetrometer Test.

28. The method according to claim 23, wherein the liquid is a mixture comprising approximately 50% by weight of water and approximately 50% by weight of hydrogen peroxide at 120 volumes.

29. The method according to claim 23, wherein the step of baking comprises the sub-steps of:
    baking the raw material for 4 hours at a temperature ranging from the room temperature to 200° C., so as to eliminate the liquid that is still present in the dried raw material whereby;
    baking the raw material for 4 hours with a temperature ranging from 200° C. to 500° C., so as to enable combustion and/or the passage to the gaseous phase of the granules added to the mixture of raw material;
    baking the raw material for 4 hours with a temperature ranging from 500° C. to 800° C., so as to cause the change of mineralogical composition in the clays present in the mixture of raw material, thus causing hardening and/or cementation;
    baking the raw material for 4 hours with a temperature ranging from 800° C. to 1000° C., so as to complete the hardening and/or cementation of the material.

30. The method according to claim 23 and comprising the step of shaping said raw material; wherein the step of shaping is subsequent to the step of forming a mixture and prior to the step of drying; and said method comprising the step of cooling said material is subsequent to the step of baking.

31. The method according to claim 23, wherein
    the starting powder in a percentage ranging from 60% to 70% of the total weight of a solid fraction of the mixture;
    the first part of granules with a grain size ranging from 0.1 mm to 0.1 µm in a percentage ranging from 20% to 25% of the solid fraction of the mixture; and the second part of granules with a grain size ranging from 0.1 mm to 1 μm in a percentage by weight ranging from 8% to 15% of the solid fraction of the mixture.

32. The method according to claim 24, wherein the starting material comprises
30% to 50% by weight of clays;
up to 35% by weight of loams;
up to 35% by weight of sands; and
15% by weight of calcium carbonate.

33. The method according to claim 26, wherein during the step of forming a mixture, sodium perborate is added to said starting powder with a percentage by weight ranging from 0.1% to 1% of the solid fraction of the mixture.

34. A porous material having:
pores that are interconnected, the pores having an inner surface and at least a part of the inner surface of the pores formed of a hydrophilic material;
a porosity ranging from 50% to 80%;
a permeability coefficient greater than $10^{-6}$ m/sec; and
wherein, in a given volume of the material, the total volume of pores with a diameter ranging from approximately 0.3 nm to approximately 100 nm is at least 15% of the total volume of the pores and wherein from 24% to 32% of the volume of the pores is occupied by pores having a diameter ranging from approximately 0.8 mm to approximately 6.25 μm.

35. A cooling unit comprising:
a first inlet for a dehumidification fluid;
a first outlet for the dehumidification fluid,
a body, which is formed by one or more modules,
a second inlet for an operating fluid to be cooled, and
a second outlet for the operating fluid that has been cooled;
wherein the one or more modules are at least partly made of a porous material, the porous material having pores that are interconnected, the pores having an inner surface and at least a part of the inner surface of the pores formed of a hydrophilic material;
a porosity ranging from 50% to 80%;
a permeability coefficient greater than $10^{-6}$ m/sec; and
wherein, in a given volume of the material, the total volume of pores with a diameter ranging from approximately 0.3 nm to approximately 100 nm is at least about 15% the total volume of the pores; and
wherein the body has one or more inner conduits and is interposed between the first inlet and the first outlet so that the dehumidification fluid laps the outer walls of said body in a first direction; wherein the body is interposed between the second inlet and the second outlet, so that the operating fluid flows through each inner conduit in a second direction.

36. The cooling unit according to claim 35, wherein each conduit is coated, on the inside, with a material that is capable of ensuring a thermal exchange but prevents an exchange of humidity between the material and the operating fluid.

37. The cooling unit according to claim 35, wherein each module has, furthermore, one or more channels; wherein the conduits and the channels do not intersect one another; wherein each channel is configured to be flowed through by a liquid; in particular, the cooling unit comprises sponges, which are inserted into said channels and are capable of exchanging the liquid with the material.

* * * * *